US012641674B2

(12) United States Patent
Shin et al.

(10) Patent No.: US 12,641,674 B2
(45) Date of Patent: May 26, 2026

(54) METHOD AND DEVICE FOR SUPPORTING DISCONTINUOUS RECEPTION OF SIDELINK IN WIRELESS COMMUNICATION SYSTEM

(71) Applicant: SAMSUNG ELECTRONICS CO., LTD., Suwon-si (KR)

(72) Inventors: Cheolkyu Shin, Suwon-si (KR); Hyunseok Ryu, Suwon-si (KR); Taehyoung Kim, Suwon-si (KR); Jeongho Yeo, Suwon-si (KR); Seunghoon Choi, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 465 days.

(21) Appl. No.: 17/999,745

(22) PCT Filed: Jul. 20, 2021

(86) PCT No.: PCT/KR2021/009342
§ 371 (c)(1),
(2) Date: Nov. 23, 2022

(87) PCT Pub. No.: WO2022/019615
PCT Pub. Date: Jan. 27, 2022

(65) Prior Publication Data
US 2023/0180342 A1 Jun. 8, 2023

(30) Foreign Application Priority Data
Jul. 21, 2020 (KR) ........................ 10-2020-0090360

(51) Int. Cl.
H04W 52/02 (2009.01)
H04W 72/02 (2009.01)
(Continued)

(52) U.S. Cl.
CPC ........... H04W 76/28 (2018.02); H04W 76/14 (2018.02); H04W 4/40 (2018.02); H04W 92/18 (2013.01)

(58) Field of Classification Search
CPC ....... H04W 72/40; H04W 4/40; H04W 76/28; H04W 52/0216; H04W 72/02;
(Continued)

(56) References Cited

U.S. PATENT DOCUMENTS 10,362,626 B2* 7/2019 Tseng ................... H04L 1/1883
10,624,076 B2 4/2020 Kim et al.
(Continued)

FOREIGN PATENT DOCUMENTS

CN        106165510 A    11/2016
KR    10-2018-0042141 A    4/2018
(Continued)

OTHER PUBLICATIONS

Huawei et al: "Discussion on remaining MAC open issues for 5G V2X with NR SL", 3GPP Draft; R2-2005492, 3rd Generation Partnership Project (3GPP), Mobile Competence Centre; 650, Route Des Lucioles; F-06921 Sophia-Antipolis Cedex; France vol. RAN WG2, Jun. 1, 2020-Jun. 12, 2020, May 22, 2020 (2022), XP051888819 (Year: 2020).*
(Continued)

*Primary Examiner* — Edan Orgad
*Assistant Examiner* — Vanneilian Lalchinthang

(57) ABSTRACT

The present disclosure relates to: a communication technique that merges IoT technology with a 5G communication system for supporting higher data transmission rates than 4G systems; and a system therefor. The present disclosure may be applied to intelligent services (for example, smart homes, smart buildings, smart cities, smart cars or connected cars, healthcare, digital education, retail business, security and
(Continued)

safety-related services, etc.) on the basis of 5G communication technology and IoT-related technology. In addition, the present invention relates to a method and device for a V2X-supporting vehicle terminal to perform discontinuous reception during a process of transmitting and receiving information using another vehicle terminal, a pedestrian mobile terminal, and sidelink.

15 Claims, 28 Drawing Sheets

(51) Int. Cl.

| | |
|---|---|
| *H04W 76/14* | (2018.01) |
| *H04W 76/28* | (2018.01) |
| *H04W 4/40* | (2018.01) |
| *H04W 92/18* | (2009.01) |

(58) Field of Classification Search

CPC . H04W 72/1263; H04W 76/14; H04W 24/08; H04W 72/25; H04W 72/542; H04W 52/0235; H04W 56/001; H04W 68/025; H04W 8/24; H04W 92/18; H04W 76/27; H04L 5/0094; Y02D 30/70

USPC ......................................................... 370/329

See application file for complete search history.

(56) References Cited

U.S. PATENT DOCUMENTS

| | | | | |
|---|---|---|---|---|
| 12,052,107 | B2 * | 7/2024 | Yang | ..................... H04W 72/23 |
| 2016/0219443 | A1 * | 7/2016 | Lee | ....................... H04W 76/28 |
| 2019/0159279 | A1 * | 5/2019 | Sadiq | .................... H04W 76/28 |
| 2020/0153574 | A1 | 5/2020 | Shin et al. | |
| 2020/0389900 | A1 * | 12/2020 | Lee | ....................... H04W 72/53 |
| 2021/0306948 | A1 * | 9/2021 | Ding | ................. H04W 52/0235 |

| | | | | |
|---|---|---|---|---|
| 2023/0007727 | A1 * | 1/2023 | Fan | ....................... H04L 1/1896 |
| 2023/0007729 | A1 * | 1/2023 | Wang | .................... H04W 76/14 |
| 2023/0038791 | A1 * | 2/2023 | Zhang | ............... H04W 72/0446 |
| 2023/0098631 | A1 * | 3/2023 | Lee | ....................... H04W 72/56 |
| | | | | 370/329 |
| 2023/0164768 | A1 * | 5/2023 | Park | ..................... H04W 76/14 |
| | | | | 370/329 |
| 2023/0189390 | A1 * | 6/2023 | Park | ..................... H04W 76/28 |
| | | | | 370/252 |
| 2024/0357702 | A1 * | 10/2024 | Park | ..................... H04W 76/14 |

FOREIGN PATENT DOCUMENTS

| | | |
|---|---|---|
| KR | 10-2021-0145562 A | 12/2021 |
| WO | 2018064477 A1 | 4/2018 |
| WO | 2018208114 A1 | 11/2018 |

OTHER PUBLICATIONS

Supplementary European Search Report dated Sep. 26, 2023, in connection with European Patent Application No. 21845784.4, 7 pages.

International Search Report and Written Opinion of the International Searching Authority dated Oct. 25, 2021, in connection with International Application No. PCT/KR2021/009342, 10 pages.

Huawei et al., "Discussion on remaining MAC open issues for 5G V2X with NR SL," 3GPP TSG-RAN WG2 Meeting #110 electronic, R2-2005492, 45 pages.

Panasonic, "Impact of disabling HARQ on DRX," 3GPP TSG-RAN WG2 Meeting #108, R2-1915179, 4 pages.

Office Action issued Sep. 25, 2025, in connection with Chinese Patent Application No. 202180038175.X, 17 pages.

Office Action issued Nov. 18, 2025, in connection with Korean Patent Application No. 10-2020-0090360, 8 pages.

InterDigital, "Report on email discussion on [108#99][V2X] HARQ based TX side RLM/RLF" R2-2000543, Mar. 2020, 31 pages.

* cited by examiner (b) Partial coverage
Scenario gNB/eNB/RSU

Downlink (DL)

Uplink (UL)

UE-1

Sidelink (SL)
Sidelink (SL)

UE-2

(c) Out-of-coverage
Scenario (d) Inter-cell V2X communication Scenario (a) Unicast V2X Communication

UE-1          UE-2

201          202

(b) Groupcast V2X Communication

RX Pool A
(or TX pool A)

RX Pool B
(or TX pool B)

Physical SL Slots

METHOD AND DEVICE FOR SUPPORTING DISCONTINUOUS RECEPTION OF SIDELINK IN WIRELESS COMMUNICATION SYSTEM

CROSS-REFERENCE TO RELATED APPLICATIONS

This application is a 371 of International Application No. PCT/KR2021/009342, filed Jul. 20, 2021, which claims priority to Korean Patent Application No. 10-2020-0090360, filed Jul. 21, 2020, the disclosures of which are herein incorporated by reference in their entirety.

BACKGROUND

1. Field

The disclosure relates to a wireless mobile communication system and, in particular, to a method and device for performing discontinuous reception (DRX) in a process that a vehicle terminal supporting vehicle-to-everything (V2X) transmits and receives information with another vehicle terminal and a pedestrian portable terminal through a sidelink.

2. Description of Related Art

To meet the demand for wireless data traffic having increased since deployment of 4th generation (4G) communication systems, efforts have been made to develop an improved 5th generation (5G) or pre-5G communication system. Therefore, the 5G or pre-5G communication system is also called a 'Beyond 4G Network' or a 'Post long term evolution (LTE) System'. The 5G communication system is considered to be implemented in extremely high frequency (mmWave) bands, e.g., 60 GHz band, so as to accomplish higher data rates. To decrease propagation loss of the radio waves and increase the transmission distance, the beamforming, massive multiple-input multiple-output (massive MIMO), full dimensional MIMO (FD-MIMO), array antenna, an analog beamforming, large scale antenna techniques, etc. have been discussed and adopted in the 5G communication system. In addition, in the 5G communication systems, development for system network improvement is under way based on an advanced small cell, a cloud radio access network (cloud RAN), an ultra-dense network, device-to-device (D2D) communication, wireless backhaul, moving network, cooperative communication, coordinated multi-points (CoMP), reception-end interference cancellation, and the like. In the 5G system, hybrid FSK and QAM modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of things (IoT) where distributed entities, such as things, exchange and process information without human intervention. The Internet of everything (IoE), which is a combination of the IoT technology and the big data processing technology through connection with a cloud server, has emerged. As technology elements, such as sensing technology, wired/wireless communication and network infrastructure, service interface technology, and security technology have been demanded for IoT implementation, a sensor network, a machine-to-machine (M2M) communication, machine type communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing information technology (IT) and various industrial applications.

In line with this, various attempts have been made to apply 5G communication systems to IoT networks. For example, technologies such as a sensor network, machine type communication (MTC), and machine-to-machine (M2M) communication may be implemented by beamforming, MIMO, and array antennas. Application of a cloud radio access network (cloud RAN) as the above-described big data processing technology may also be considered to be as an example of convergence between the 5G technology and the IoT technology.

SUMMARY

The disclosure relates to a wireless communication system and to a method and device for selecting transmission resources through cooperation between terminals in a process that a vehicle terminal supporting V2X exchanges information with another vehicle terminal and a pedestrian portable terminal through a sidelink. Specifically, the disclosure relates to operations of a base station and a terminal for supporting discontinuous reception (DRX) between terminals.

According to an embodiment of the disclosure for solving the above problems, a method of a first terminal in a wireless communication system may include receiving sidelink control information (SCI) from a second terminal in an active time of discontinuous reception (DRX); receiving sidelink data from the second terminal based on the SCI; operating a first timer based on the SCI; starting a second timer in response to expiration of the first timer; and receiving retransmission for the sidelink data from the second terminal at a time when the second timer operates, wherein the first terminal may operate with the active time of the DRX while the second timer operates, and a value of the first timer may be determined based on information indicating a time resource related to the retransmission of the sidelink data included in the SCI.

According to an embodiment, DRX configuration for groupcast communication or broadcast communication may be configured based on a system information block (SIB) received from a base station.

According to an embodiment, when the first terminal is located outside coverage of the base station, DRX configuration for groupcast communication or broadcast communication may be configured based on information pre-configured in the first terminal.

According to an embodiment, DRX configuration for unicast communication may be configured based on inter-terminal radio resource control (PC5-RRC) signaling.

According to an embodiment, the SCI may include first SCI transmitted in a PSCCH and second SCI transmitted in a PSSCH, and the first terminal may operate with the active time of the DRX during operation of a third timer that starts in response to reception of the first SCI and the second SCI.

According to an embodiment of the disclosure, a first terminal in a wireless communication system may include a transceiver; and a controller configured to receive sidelink control information (SCI) from a second terminal in an active time of discontinuous reception (DRX), to receive sidelink data from the second terminal based on the SCI, to operate a first timer based on the SCI, to start a second timer in response to expiration of the first timer, and to receive retransmission for the sidelink data from the second terminal at a time when the second timer operates, wherein the first terminal may operate with the active time of the DRX while the second timer operates, and a value of the first timer may be determined based on information indicating a time resource related to the retransmission of the sidelink data included in the SCI.

According to an embodiment of the disclosure, a method of a second terminal in a wireless communication system may include transmitting sidelink control information (SCI) to a first terminal, in which discontinuous reception (DRX) is configured, in an active time of the DRX; transmitting sidelink data to the first terminal according to the SCI; and transmitting retransmission of the sidelink data to the first terminal in a time when a second timer of the first terminal operates, wherein the second timer may be started in response to expiration of a first timer operating based on the SCI, and a value of the first timer may be determined based on information indicating a time resource related to the retransmission of the sidelink data included in the SCI.

According to an embodiment of the disclosure, a second terminal in a wireless communication system may include a transceiver; and a controller configured to transmit sidelink control information (SCI) to a first terminal, in which discontinuous reception (DRX) is configured, in an active time of the DRX, to transmit sidelink data to the first terminal according to the SCI, and to transmit retransmission of the sidelink data to the first terminal in a time when a second timer of the first terminal operates, wherein the second timer may be started in response to expiration of a first timer operating based on the SCI, and a value of the first timer may be determined based on information indicating a time resource related to the retransmission of the sidelink data included in the SCI.

The disclosure proposes a procedure for performing discontinuous reception (DRX) between terminals in sidelink communication. The proposed method can be applied and effectively used to minimize the power consumption of the terminal.

BRIEF DESCRIPTION OF THE DRAWINGS

FIG. 9F is a diagram illustrating a sixth example of a method in which DRX is performed in a sidelink according to an embodiment of the disclosure.

FIG. 9H is a diagram illustrating an eighth example of a method in which DRX is performed in a sidelink according to an embodiment of the disclosure.

DETAILED DESCRIPTION

Figure 1A:
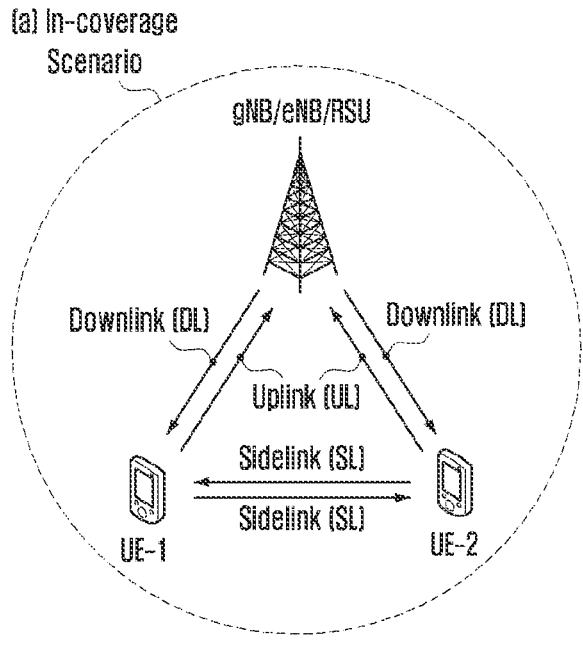
FIG. 1A is a diagram illustrating an example of a case in which all V2X UEs are located within the coverage of a base station according to an embodiment of the disclosure.

Hereinafter, embodiments of the disclosure will be described in detail with reference to the accompanying drawings.

In describing embodiments, descriptions of technical contents that are well known in the technical field to which the disclosure pertains and are not directly related to the disclosure will be omitted. This is to more clearly convey the subject matter of the disclosure without obscuring it by omitting unnecessary description.

For the same reason, some elements are exaggerated, omitted, or schematically illustrated in the accompanying drawings. In addition, the depicted size of each element does not fully reflect the actual size. In the drawings, the same or corresponding elements are assigned the same reference numerals.

The advantages and features of the disclosure and the manner of achieving them will become apparent through embodiments described below with reference to the accompanying drawings. The disclosure may be, however, embodied in many different forms and should not be construed as being limited to the embodiments set forth herein. Rather, these embodiments are provided so that the disclosure will be thorough and complete and will fully convey the scope of the disclosure to those skilled in the art. The disclosure is only defined by the scope of the appended claims. Throughout the specification, the same reference numerals refer to the same constitutional elements.

It will be understood that each block of the flowchart illustrations, and combinations of blocks in the flowchart illustrations, may be implemented by computer program instructions. These computer program instructions may be provided to a processor of a general purpose computer, special purpose computer, or other programmable data processing apparatus to produce a machine, such that the instructions, which are executed via the processor of the computer or other programmable data processing apparatus, generate means for implementing the functions specified in the flowchart block(s). These computer program instructions may also be stored in a computer usable or computer-readable memory that may direct a computer or other programmable data processing apparatus to function in a particular manner, such that the instructions stored in the computer usable or computer-readable memory produce an article of manufacture including instruction means that implement the function specified in the flowchart block(s). The computer program instructions may also be loaded onto a computer or other programmable data processing apparatus to cause a series of operational steps to be performed on the computer or other programmable apparatus to produce a computer implemented process such that the instructions that are executed on the computer or other programmable apparatus provide steps for implementing the functions specified in the flowchart block(s).

In addition, each block of the flowchart illustrations may represent a module, segment, or portion of code, which comprises one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

As used herein, the term "unit" refers to a software element or a hardware element, such as a field programmable gate array (FPGA) or an application specific integrated circuit (ASIC), which performs a predetermined function. However, the term "unit" does not always have a meaning limited to software or hardware. A "unit" may be constructed either to be stored in an addressable storage medium or to execute one or more processors. Therefore, a "unit" includes, for example, software elements, object-oriented software elements, class elements or task elements, processes, functions, properties, procedures, subroutines, segments of a program code, drivers, firmware, micro-codes, circuits, data, database, data structures, tables, arrays, and variables. The functions provided by elements and units may be combined into those of a smaller number of elements and units or separated into those of a larger number of elements and units. In addition, the elements and units may be implemented to operate one or more central processing units (CPUs) within a device or a secure multimedia card. Also, in an embodiment, the unit may include one or more processors.

Embodiments of the disclosure will be described herein focusing a wireless access network, i.e., new radio (NR), and a packet core, i.e., a 5G system, a 5G core network, or a next generation (NG) core, according to the 5G mobile communication standard specified by the 3rd generation partnership project (3GPP) which is a mobile communication standardization organization. However, the subject matter of the disclosure can be also applied to other communication systems having similar technical backgrounds through slight modification without departing from the scope of the disclosure as being apparent to those skilled in the art.

In the 5G system, a network data collection and analysis function (NWDAF), which is a network function of collecting, analyzing, and providing data in the 5G network, may be defined so as to support network automation. The NWDAF may collect information from the 5G network, store and analyze the collected information, and provide a result of analysis to an unspecified network function (NF). The result of analysis may be used independently in each NF.

Some terms and names defined in the 3GPP standards (e.g., 5G, NR, LTE, or similar system standards) will be used for the convenience of description. However, the disclosure is not limited by such terms and names, and may be also applied to any other system that complies with any other standard.

Further, terms for identifying access nodes, terms referring to network entities, terms referring to messages, terms referring to interfaces between network entities, terms referring to various identification information, and the like are illustratively used for the sake of convenience. Therefore, the disclosure is not limited by the terms as used below, and other terms referring to subjects having equivalent technical meanings may be used.

To meet the demand for wireless data traffic having increased since deployment of 4G communication systems, efforts have been made to develop an improved 5G communication system (NR, new radio). To accomplish higher data rates, the 5G communication system is designed to enable resources in extremely high frequency (mmWave) bands (e.g., 28 GHz frequency band). To decrease propagation loss of the radio waves and increase the transmission distance, the beamforming, massive multiple-input multiple-output (massive MIMO), full dimensional MIMO (FD-MIMO), array antenna, an analog beamforming, large scale antenna techniques, etc. have been discussed and adopted in the 5G communication system. In addition, unlike the LTE, the 5G communication system supports various subcarrier spacings such as 15 kHz, 30 kHz, 60 kHz, and 120 kHz, uses a polar coding for a physical control channel, and uses a low density parity check (LDPC) for a physical data channel. Besides, CP-OFDM as well as DFT-S-OFDM are used as a waveform for uplink transmission. The LTE supports hybrid ARQ (HARQ) retransmission in units of a transport block (TB), whereas the 5G can additionally support HARQ retransmission based on a code block group (CBG) in which a plurality of code blocks (CBs) are bundled.

Furthermore, in the 5G communication system, development for system network improvement is under way based on an advanced small cell, a cloud radio access network (cloud RAN), an ultra-dense network, device-to-device (D2D) communication, wireless backhaul, a vehicle-to-everything (V2X) network, cooperative communication, coordinated multi-points (CoMP), reception-end interference cancellation, and the like.

The Internet, which is a human centered connectivity network where humans generate and consume information, is now evolving to the Internet of things (IoT) where distributed entities, such as things, exchange and process information without human intervention. The Internet of everything (IoE), which is a combination of the IoT technology and the big data processing technology through connection with a cloud server, has emerged. As technology elements, such as sensing technology, wired/wireless communication and network infrastructure, service interface technology, and security technology have been demanded for IoT implementation, a sensor network, a machine-to-machine (M2M) communication, machine type communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing information technology (IT) and various industrial applications.

In line with this, various attempts have been made to apply 5G communication systems to IoT networks. For example, technologies such as a sensor network, machine type communication (MTC), and machine-to-machine (M2M) communication may be implemented by beamforming, MIMO, and array antennas. Application of a cloud radio access network (cloud RAN) as the above-described big data processing technology may also be considered to be as an example of convergence between the 5G technology and the IoT technology. As such, a great variety of services may be provided to users in the communication system. In order to provide such services to users, a method and apparatus for providing respective services within the same time interval are required. One of such services provided in the 5G communication system is a service that satisfies requirements of low latency and high reliability.

In case of vehicular communication, the NR V2X system supports unicast communication, groupcast (or multicast) communication, and broadcast communication between UEs. In addition, unlike the LTE V2X that aims to transmit and receive basic safety information required for road driving of a vehicle, the NR V2X aims to provide more advanced services such as platooning, advanced driving, extended sensors, and remote driving.

In particular, discontinuous reception (DRX) between UEs may be considered in sidelink communication. Applying the DRX can minimize the power consumption of UE and thereby increase battery efficiency. Specifically, the power consumed in a reception process of UE in a sidelink may be subdivided as follows.

Decoding of control information 1st SCI transmitted through PSCCH: UE scheduling information is contained in the 1st SCI, and information acquired by decoding the 1st SCI may be used to perform sensing Decoding of control information 2nd SCI transmitted through PSSCH: Other control information not contained in the 1st SCI is contained in the 2nd SCI Decoding of data transmitted through PSSCH Therefore, in a time interval configured as off-duration by applying DRX in the sidelink, the UE may not perform decoding on the control information and data information. In contrast, the UE may perform decoding on the control information and data information only in a time interval configured as on-duration by applying DRX. The disclosure proposes methods of defining off-duration and on-duration for DRX. In addition, the disclosure proposes methods for enabling the UE performing communication in the sidelink to perform DRX by matching off-duration and on-duration for the DRX.

Embodiments of the disclosure are proposed to support the above-described scenario, in particular, aiming to provide a method and device for performing discontinuous reception (DRX) between UEs in a sidelink.

FIGS. 1A to 1D are diagrams illustrating a communication system according to an embodiment of the disclosure.

FIG. 1A shows an in-coverage (IC) scenario in which all V2X UEs (UE-1 and UE-2) are located within the coverage of a base station. All the V2X UEs are capable of receiving data and control information from the base station through a downlink (DL) or transmitting data and control information to the base station through an uplink (UL). Such data and control information may be available for V2X communication or for general cellular communication. In addition, the V2X UEs are capable of transmitting/receiving data and control information for V2X communication through a sidelink (SL).

Figure 1B:
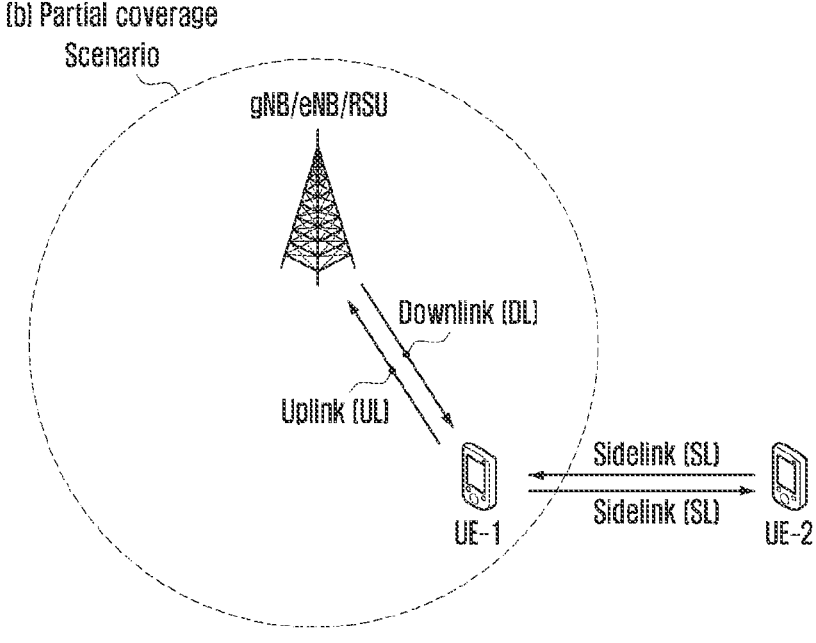
FIG. 1B is a diagram illustrating an example of a case in which some V2X UEs are located within the coverage of a base station and other V2X UEs are located outside the coverage of the base station according to an embodiment of the disclosure.

FIG. 1B shows a scenario in which, among V2X UEs, UE-1 is located within the coverage of the base station and UE-2 is located outside the coverage of the base station. That is, FIG. 1B shows a partial coverage (PC) scenario in which a certain V2X UE (UE-2) is located out of the coverage of the base station. The V2X UE-1 located within the coverage of the base station is capable of receiving data and control information from the base station through the downlink or transmitting data and control information to the base station through the uplink. The V2X UE-2 located out of the coverage of the base station is incapable of receiving data and control information from the base station through the downlink and incapable of transmitting data and control information to the base station through the uplink. The V2X UE-2 is capable of transmitting/receiving data and control information for V2X communication to/from the UE-1 through the sidelink.

Figure 1C:
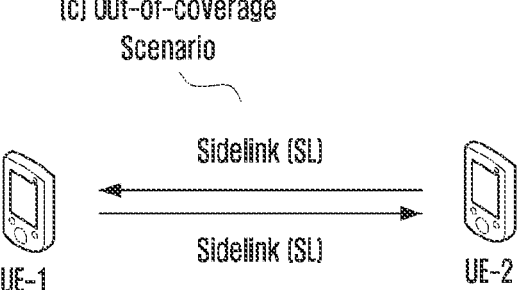
FIG. 1C is a diagram illustrating an example of a case in which all V2X UEs are located outside the coverage of a base station according to an embodiment of the disclosure.

FIG. 1C shows an out-of-coverage (OOC) scenario in which all V2X UEs are located out of the coverage of the base station. Therefore, the V2X UEs (UE-1 and UE-2) are incapable of receiving data and control information from the base station through the downlink and incapable of transmitting data and control information to the base station through the uplink. The V2X UEs (UE-1 and UE-2) are capable of transmitting/receiving data and control information for V2X communication through the sidelink.

Figure 1D:
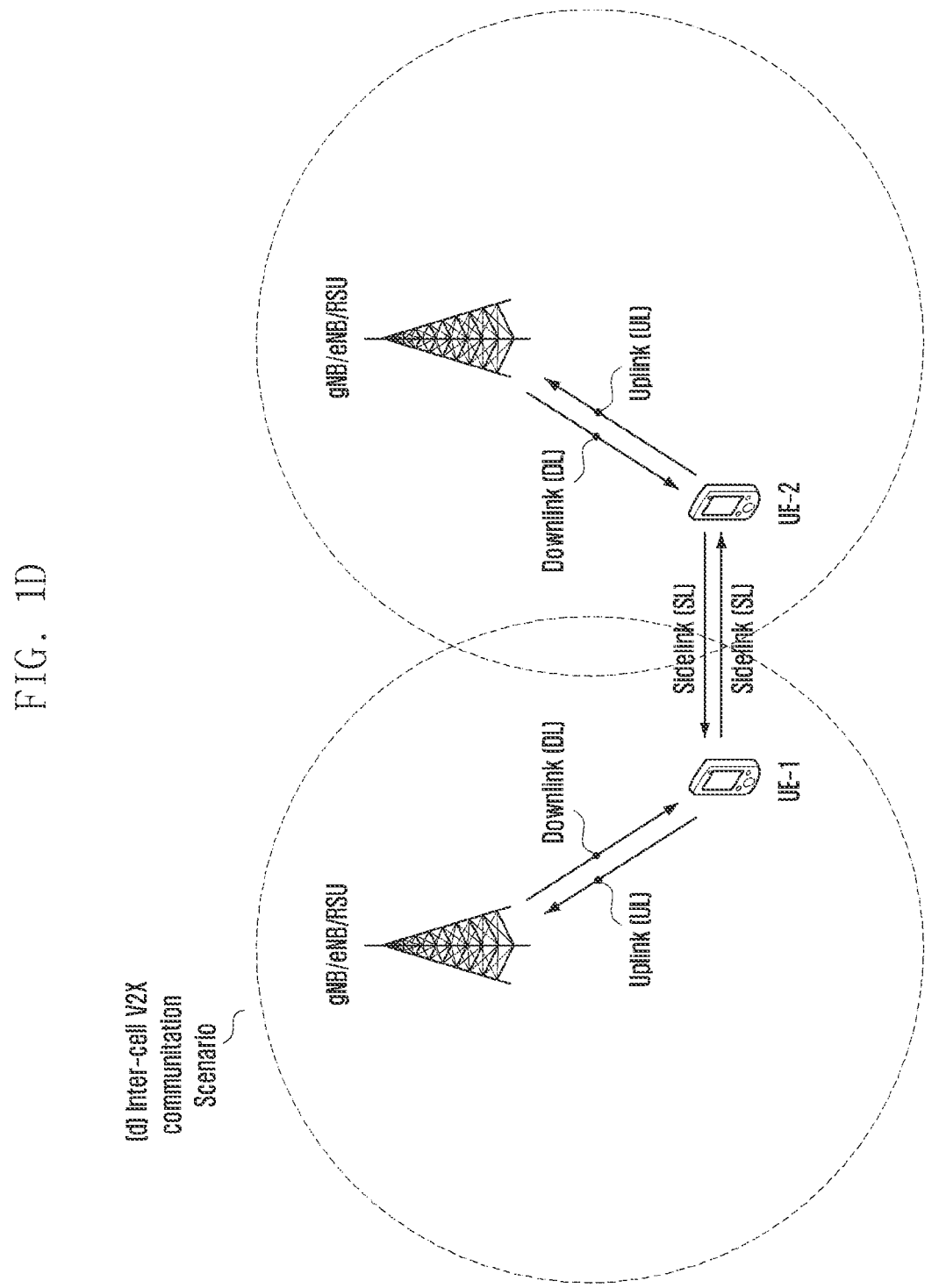
FIG. 1D is a diagram illustrating an example in which V2X UEs located in different cells perform V2X communication with each other according to an embodiment of the disclosure.

FIG. 1D shows an inter-cell scenario in which V2X UEs (UE-1 and UE-2) located in different cells perform V2X communication with each other. Specifically, FIG. 1D shows a case where the V2X UEs (UE-1 and UE-2) are connected to different base stations (an RRC connected state) or are camping on (an RRC connection released state, i.e., an RRC idle state). In this scenario, the V2X UE-1 may be a V2X transmitting UE, and the V2X UE-2 may be a V2X receiving UE. Alternatively, the V2X UE-1 may be the V2X receiving UE, and the V2X UE-2 may be the V2X transmitting UE. The V2X UE-1 may receive a system information block (SIB) from a base station which the V2X UE-1 is connected to (or is camping on), and the V2X UE-2 may receive the SIB from another base station which the V2X UE-2 is connected to (is camping on). In this case, as the SIB, an existing SIB or an SIB defined separately for V2X may be used. In addition, information of the SIB received by the V2X UE-1 and information of the SIB received by the V2X UE-2 may be different from each other. Therefore, to enable V2X communication between UEs (UE-1 and UE-2) located in different cells, information needs to be unified, or a method of interpreting SIB information transmitted from the other cell through signaling of information may be additionally required.

Although FIGS. 1A to 1D illustrate a V2X system composed of two V2X UEs (UE-1 and UE-2) for convenience of description, this is not a limited thereto and communication between more V2X UEs may be performed. In addition, an interface (an uplink and a downlink) between a base station and a V2X UE may be referred to as a Uu interface, and a sidelink between V2X UEs may be referred to as a PC5 interface. Therefore, in the disclosure, the above terms may be used interchangeably. Meanwhile, in the disclosure, the UE may include a vehicle that supports vehicle-to-vehicle (V2V) communication, a vehicle or a pedestrian's handset (e.g., a smartphone) that supports vehicle-to-pedestrian (V2P) communication, a vehicle that supports vehicle-to-network (V2N) communication, or a vehicle that supports vehicle-to-infrastructure (V2I) communication. In addition, the UE may include a road side unit (RSU) having a UE function, an RSU having a base station function, or an RSU having a part of the base station function and a part of the UE function.

In addition, according to an embodiment of the disclosure, a base station may be a base station that supports both V2X communication and general cellular communication, or a base station that supports only V2X communication. The base station may be a 5G base station (gNB), a 4G base station (eNB), or an RSU. Therefore, in the disclosure, the base station may be referred to as the RSU.

Figure 2A:
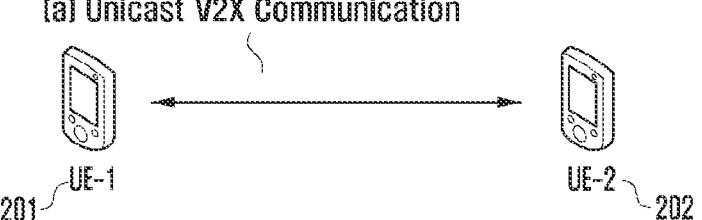
FIG. 2A is a diagram illustrating a V2X communication method based on unicast communication according to an embodiment of the disclosure.
Figure 2B:
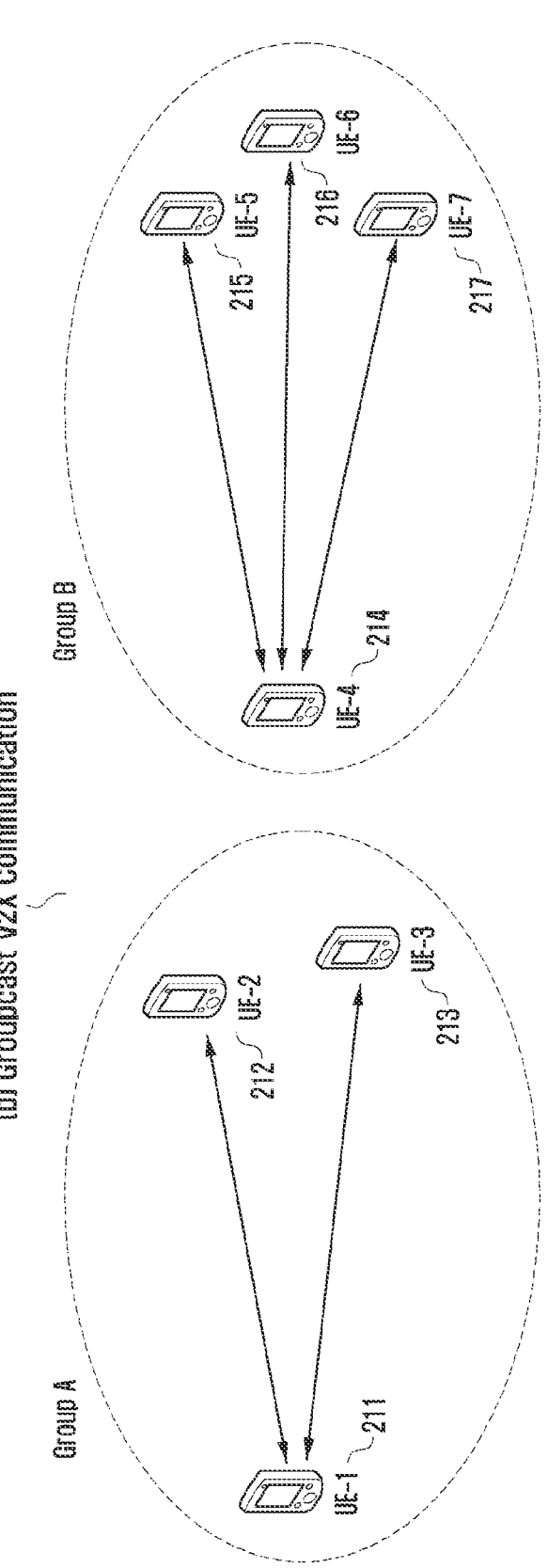
FIG. 2B is a diagram illustrating a V2X communication method based on groupcast or multicast communication according to an embodiment of the disclosure.

FIGS. 2A and 2B are diagrams illustrating a V2X communication method performed through a sidelink according to an embodiment of the disclosure.

With reference to FIG. 2A, a UE-1 201 (e.g., a TX UE) and a UE-2 202 (e.g., an RX UE) may perform one-to-one communication, which may be referred to as unicast communication.

With reference to FIG. 2B, TX UEs and RX UEs may perform one-to-many communication, which may be referred to as groupcast or multicast communication. In FIG. 2B, a UE-1 211, a UE-2 212, and a UE-3 213 form one group (group A) and perform groupcast communication, and a UE-4 214, a UE-5 215, a UE-6 216, and a UE-7 217 form another group (group B) and perform groupcast communication. Each UE performs groupcast communication only within a group to which it belongs, and communication between groups may be performed via unicast, groupcast, or broadcast communication. Although FIG. 2B illustrates two groups (group A and group B), this is not a limitation.

Although not shown in FIGS. 2A and 2B, V2X UEs may perform broadcast communication. The broadcast communication refers to a case where all V2X UEs receive data and control information transmitted by a V2X transmitting UE through a sidelink. For example, in FIG. 2B, assuming that the UE-1 211 is a transmitting UE for broadcast, all the other UEs (the UE-2 212, the UE-3 213, the UE-4 214, the UE-5 215, the UE-6 216, and the UE-7 217) can receive data and control information transmitted by the UE-1 211.

Unlike the LTE V2X, the NR V2X may consider supporting a form in which a vehicle UE transmits data to only one specific node through unicast and a form in which a vehicle UE transmits data to a specific number of nodes through groupcast. For example, these unicast and groupcast technologies can be usefully used in a service scenario such as platooning, which is a technology for moving two or more vehicles connected in a single network in a cluster form. Specifically, unicast communication may be required for a leader node of a group connected by platooning to control one specific node, and groupcast communication may be required for simultaneously controlling a group composed of a number of specific nodes.

Figure 3:
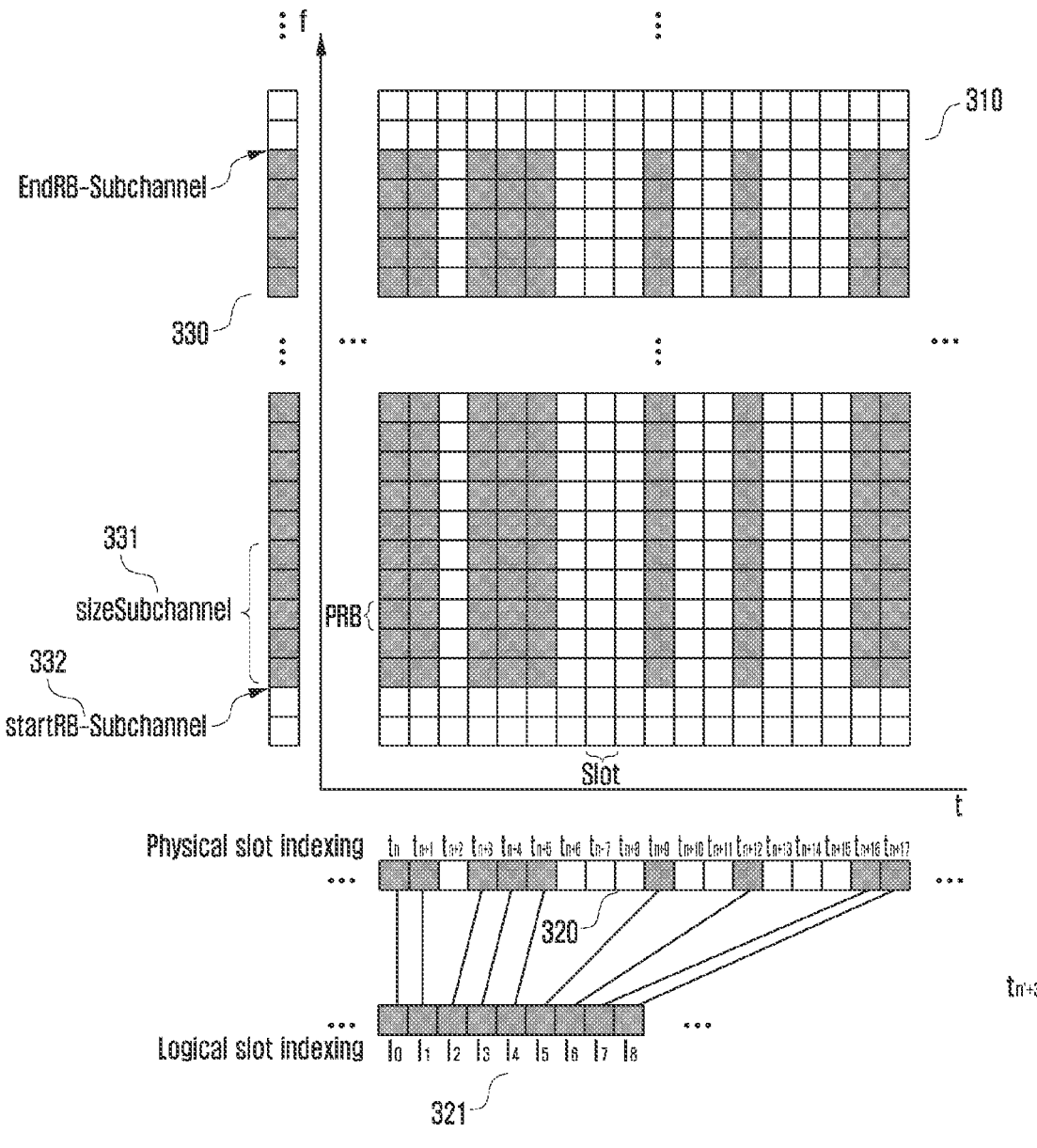
FIG. 3 is a diagram illustrating a resource pool defined as a set of resources in time and frequency domains used for sidelink transmission and reception according to an embodiment of the disclosure.

FIG. 3 is a diagram illustrating a resource pool defined as a set of resources in time and frequency domains used for sidelink transmission and reception according to an embodiment of the disclosure.

In the resource pool, a resource granularity of the time axis may be a slot. In addition, a resource granularity of the frequency axis may be a sub-channel composed of one or more physical resource blocks (PRBs).

In a case 310 that the resource pool is allocated in time and frequency domains, a colored region indicates a region configured as the resource pool in time and frequency domains. Although the disclosure describes an example in which the resource pool is discontinuously allocated in time domain, the resource pool may also be continuously allocated in time domain. In addition, although the disclosure describes an example in which the resource pool is continuously allocated in frequency domain, a method of discontinuously allocating the resource pool in frequency domain is not excluded.

With reference to FIG. 3, a case 320 that the resource pool is discontinuously allocated in time domain is illustrated. With reference to FIG. 3, shown is a case in which the granularity of time domain resource allocation is a slot. Specifically, one slot composed of a plurality of OFDM symbols may be a basic unit of resource allocation on the time axis. In this case, all OFDM symbols constituting the slot may be used for sidelink transmission, or some of OFDM symbols constituting the slot may be used for sidelink transmission. For example, the others of OFDM symbols constituting of the slot may be used for the down-link/uplink used as the Uu interface between the base station and the UE. With reference to FIG. 3, a colored slot indicates a slot included in a resource pool based on time, and this slot allocated to the resource pool may be (pre-)configured with resource pool information in time domain. In the disclosure, (pre-)configuration may refer to configuration information pre-configured in the UE and stored in advance, or may refer to a case in which the UE is configured in a cell-common scheme from the base station. Here, the cell-common scheme may mean that UEs belonging to a cell receive the same information configuration from the base station. In this case, a method that the UE receives a sidelink system information block (SL-SIB) from the base station and acquires cell-common information may be considered. Also, a method that the UE is configured in a UE-specific scheme after establishing the RRC connection with the base station may be considered. Here, UE-specific may be replaced with the term UE-dedicated, and it may mean that each UE receives configuration information with a specific value. In this case, a method that the UE receives an RRC message from the base station and acquires UE-specific information may be considered.

With reference to FIG. 3, a physical slot 320 belonging to a resource pool that is non-contiguous in time domain may be mapped to a logical slot 321. In general, a set of slots belonging to a physical sidelink shared channel (PSSCH) resource pool may be represented by (t0, t1, . . . , ti, . . . , tTmax).

With reference to FIG. 3, a case 330 that the resource pool is continuously allocated in frequency domain is illustrated.

Resource allocation on the frequency axis may be per-formed in units of sub-channel 331 in a sidelink bandwidth part (BWP). The sub-channel 331 may be defined as the granularity of frequency domain resource allocation com-posed of one or more RBs. That is, the sub-channel 331 may be defined as an integer multiple of RB. With reference to FIG. 3, the sub-channel 331 may be composed of five consecutive PRBs, and the size of the sub-channel (sizeSub-channel) may be the size of five consecutive PRBs. How-ever, shown in the drawings is only an example of the disclosure, and the size of the sub-channel may be config-ured differently. One sub-channel may be composed of consecutive PRBs, but it is not necessarily composed of consecutive PRBs. The sub-channel 331 may be a basic unit of resource allocation for the PSSCH.

The startRB-Subchannel 332 may indicate a start position of the sub-channel 331 on the frequency axis in the resource pool. In a case that the resource allocation is performed in units of sub-channels 331 on the frequency axis, resources may be allocated in frequency domain through configuration information on the RB index (startRB-Subchannel, 332) for start of the sub-channel 331, the number (sizeSubchannel) of RBs constituting the sub-channel 331, and the total number (numSubchannel) of sub-channels 331, etc. In this case, information on startRB-Subchannel, sizeSubchannel, and numSubchannel may be (pre-)configured as frequency domain resource pool information.

Figure 4:
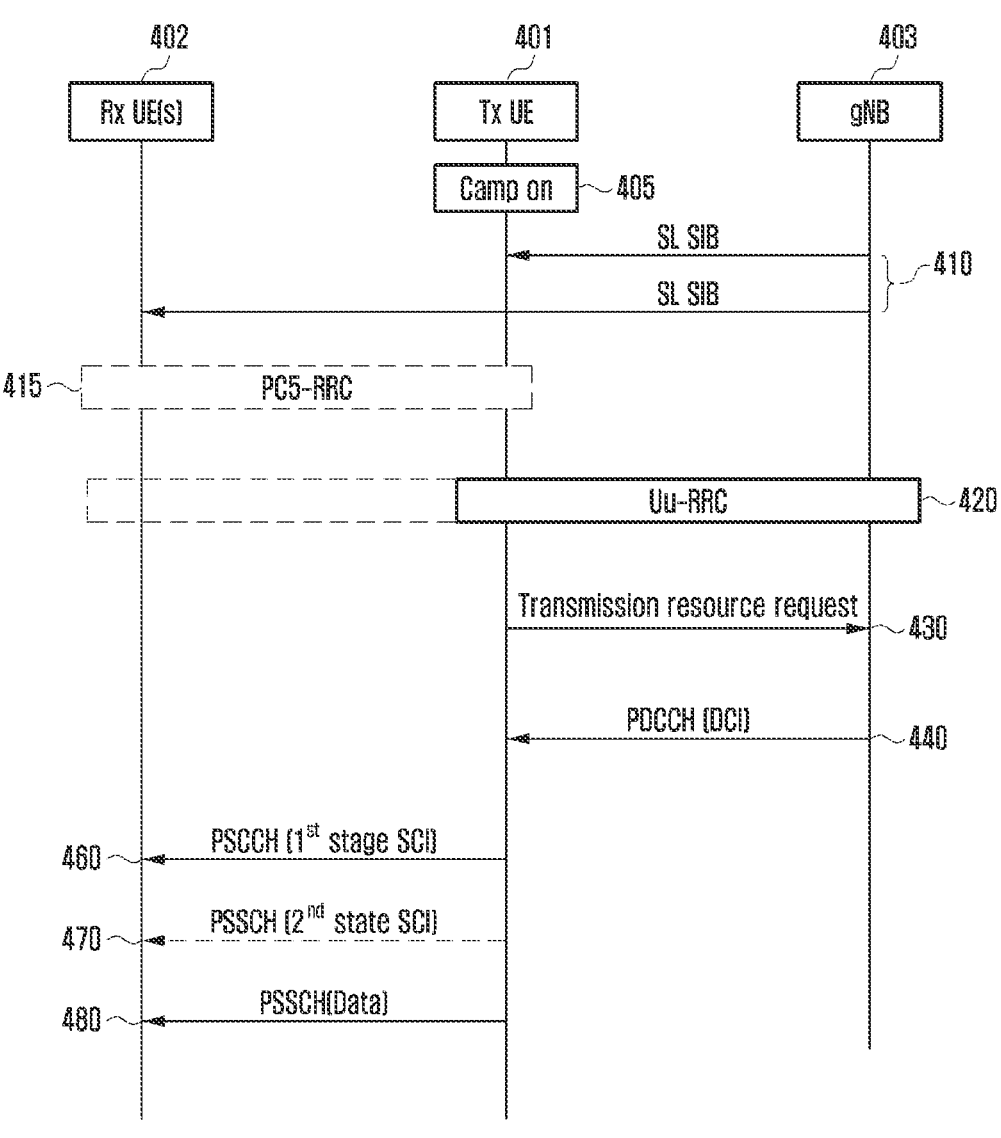
FIG. 4 is a diagram illustrating a method for a base station to allocate a transmission resource in a sidelink according to an embodiment of the disclosure.

FIG. 4 is a diagram illustrating a method for a base station to allocate a transmission resource in a sidelink according to an embodiment of the disclosure.

The method for the base station to allocate the transmis-sion resource in the sidelink will be referred to as Mode 1 hereinafter. Mode 1 may be a scheduled resource allocation. Mode 1 may indicate a method in which the base station allocates resources used for sidelink transmission to RRC-connected UEs in a dedicated scheduling scheme. The method of Mode 1 can be effective for interference man-agement and resource pool management because the base station can manage sidelink resources.

With reference to FIG. 4, a transmitting UE 401, which is camping on (405), and a receiving UE 402 may receive a sidelink system information block (SL-SIB) from a base station (gNB) 403 (step 410). Here, the receiving UE 402 indicates a UE receiving data transmitted by the transmitting UE 401. The SL-SIB information may include sidelink resource pool information for sidelink transmission/recep-tion, parameter configuration information for sensing opera-tion, information for configuring sidelink synchronization, or carrier information for sidelink transmission/reception operating at different frequencies.

When data traffic for V2X is generated in the transmitting UE 401, the transmitting UE 401 may be RRC-connected to the base station 403 (step 420). Here, the RRC connection between the UE and the base station may be referred to as Uu-RRC. The Uu-RRC connection process 420 may be performed before the data traffic generation of the transmit-ting UE 401. Also, in Mode 1, in a state where the Uu-RRC connection process 420 between the base station 403 and the receiving UE 402 is performed, the transmitting UE 401 may perform transmission to the receiving UE 402 via the sidelink. Contrary to this, in Mode 1, the transmitting UE 401 can perform transmission to the receiving UE 402 through the sidelink even in a state where the Uu-RRC connection process 420 between the base station 403 and the receiving UE 402 is not performed.

The transmitting UE 401 may request a transmission resource capable of performing V2X communication with the receiving UE 402 from the base station 403 (step 430). At this time, using a physical uplink control channel (PUCCH), an RRC message, or a MAC CE, the transmitting UE 401 may request a sidelink transmission resource from the base station 403. The MAC CE may be a buffer status report (BSR) MAC CE of a new format (including at least an indicator indicating the BSR for V2X communication and information on the size of data buffered for D2D commu-nication). Also, the transmitting UE 401 may request a sidelink resource through a scheduling request (SR) bit transmitted through the physical uplink control channel.

Next, the base station 403 may allocate a V2X transmis-sion resource to the transmission UE 401. At this time, the base station may allocate the transmission resource in a dynamic grant or configured grant scheme.

First, in case of the dynamic grant scheme, the base station may allocate a resource for TB transmission through downlink control information (DCI). Sidelink scheduling information contained in the DCI may include parameters related to transmission occasion and frequency allocation location information fields of initial transmission and retransmission. The DCI for the dynamic grant scheme may include a cyclic redundancy check (CRC) scrambled with SL-V-RNTI to indicate the dynamic grant scheme. The DCI for the dynamic grant scheme may be CRC-scrambled with SL-V-RNTI to indicate the dynamic grant scheme.

Next, in case of the configured grant scheme, the base station may periodically allocate resources for TB transmis-sion by configuring a semi-persistent scheduling (SPS) interval through Uu-RRC. In this case, the base station may allocate resources for one TB through the DCI. The sidelink scheduling information for one TB contained in the DCI may include parameters related to transmission occasion and frequency allocation location information of initial trans-mission and retransmission resources. In a case that resources are allocated in the configured grant scheme, the transmission occasion and frequency allocation location of the initial transmission and retransmission for one TB can be determined by the DCI, and the resource for the next TB may be repeated at the SPS interval. The DCI for the configured grant scheme may be CRC-scrambled with SL-SPS-V-RNTI to indicate the configured grant scheme. In addition, the configured grant (CG) scheme may be divided into type1 CG and type2 CG. In case of Type2 CG, it is possible to activate/deactivate a resource configured with the configured grant through the DCI.

Therefore, in case of Mode 1, the base station 403 may instruct the transmitting UE 401 to schedule for sidelink communication with the receiving UE 402 through DCI transmission via the PDCCH (step 440).

Specifically, as downlink control information (DCI) used by the base station 403 to indicate scheduling for sidelink communication to the transmitting UE 401, there may be DCI format 3_0 or DCI format 3_1. The DCI format 3_0 may be defined as DCI for scheduling an NR sidelink in one cell, and the DCI format 3_1 may be defined as DCI for scheduling an LTE sidelink in one cell.

More specifically, DCI format 3_0 includes the following information and may be indicated by the base station 403 to the transmitting UE 401. The UE may receive the DCI format 3_0 from the base station and grasp scheduling information for sidelink transmission.

Resource pool index
  In the case that a plurality of resource pools are configured, the base station may indicate a selected pool. It may include $\lceil \log_2 I \rceil$ bit information. Here, I represents the number of transmission resource pools configured by a higher layer and may be set to 0 bit when only one resource pool is configured. If a plurality of resource pools are configured, zero bits may be padded after configuring the remaining fields except for padding bits below for the remaining resource pools based on the resource pool requiring the most amount of information according to the resource pool.

Time gap
  It may indicate a time interval for receiving DCI and performing sidelink transmission. It may be composed of 3-bit information and a corresponding value may be configured by a higher layer.

HARQ process ID
  It may indicate HARQ process ID. It may include $\lceil \log_2 N_{process} \rceil$ bit information. Here, $N_{process}$ represents the number of HARQ processes.

New data indicator
  It may indicate a new transport block (TB) or not. It may be composed of 1-bit information.

Lowest index of the sub-channel allocation to the initial transmission
  It may indicate a resource allocation position (lowest sub-channel index) for initial transmission. It may include $$\lceil \log_2 (N_{subChannel}^{SL}) \rceil$$

bit information. Here, $$N_{subChannel}^{SL}$$

indicates the number of sub-channels configured in the resource pool.

SCI format 1-A fields of frequency and time resource assignment
  It may indicate frequency and time resource allocation information indicated by SCI format 1-A. Whether the maximum number of transmission reservation resources is 2 or 3 may be configured by a higher layer (resource pool), and accordingly the number of bits used for frequency and time resources may be determined. For details, refer to frequency and time resource allocation information indicated by SCI format 1-A below.

PSFCH-to-HARQ feedback timing indicator
  It may indicate a time interval for the UE to receive PSFCH and report HARQ feedback to the base station. It may include $\lceil \log_2 N_{fb\_timing} \rceil$ bit information. Here, $N_{fb\_timing}$ indicates the number of entries configured by a higher layer, and when only one entry is configured, it may be configured with 0 bit.

PUCCH resource indicator
  It may indicate a PUCCH resource in which the UE receives the PSFCH and reports the HARQ feedback to the base station. It may be composed of 3-bit information.

Configuration index
  Configuration index may be indicated for configured grant (CG) type2. It may be composed of 3-bit information.

Counter sidelink assignment index
  It may indicate a codebook for the UE to receive the PSFCH and report the HARQ feedback to the base station. Type1/Type2 sidelink HARQ-ACK codebook may be supported and may consist of 2-bit information.

Padding bits, if required
  Zero bits may be padded to match the size with other DCI formats.

In the disclosure, information that can be included in DCI format 3_0 is not limited to the above-described information.

In case of broadcast transmission, the transmitting UE 401 may perform transmission without RRC setup 415 for the sidelink. Contrary to this, in case of unicast or groupcast transmission, the transmitting UE 401 may perform RRC connection with another UE on a one-to-one basis. Here, the RRC connection between UEs may be referred to as PC5-RRC 415 to be distinguished from Uu-RRC. In case of groupcast, the PC5-RRC 415 may be individually connected between UEs in a group. With reference to FIG. 4, although the connection of the PC5-RRC 415 is shown as an operation after the transmission 410 of the SL-SIB, it may be performed at any time before the transmission 410 of the SL-SIB or before the transmission of the SCI.

Next, the transmitting UE 401 may transmit 1st stage SCI to the receiving UE 402 through the PSCCH (step 460). In addition, the transmitting UE 401 may transmit 2nd stage SCI to the receiving UE 402 through the PSSCH (step 470). In this case, the 1st stage SCI may contain information related to resource allocation, and the 2nd stage SCI may contain other control information. In addition, the transmitting UE 401 may transmit data to the receiving UE 402 through the PSSCH (step 480). The 1st stage SCI, the 2nd stage SCI, and the PSSCH may be transmitted together in the same slot.

Figure 5:
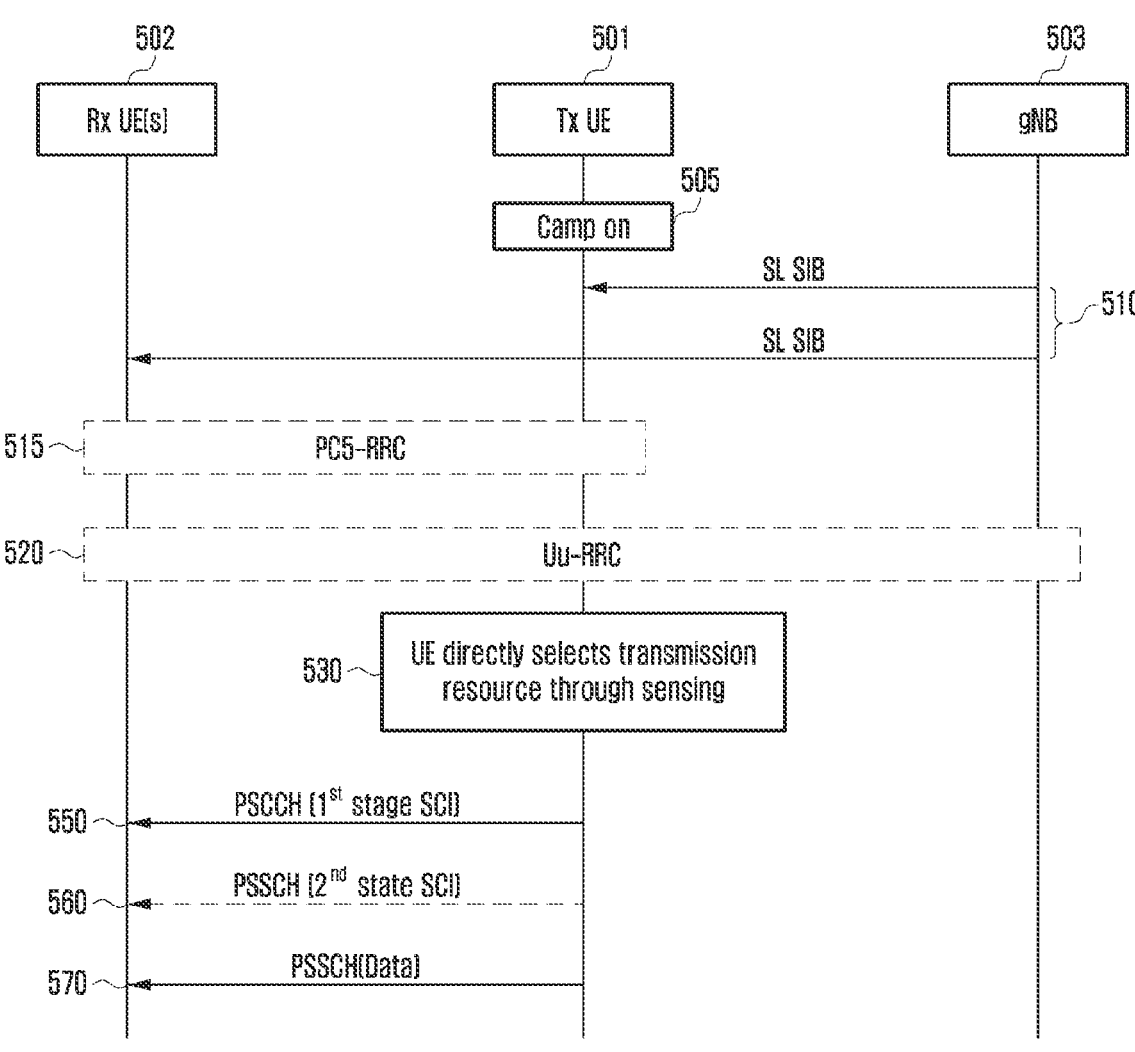
FIG. 5 is a diagram illustrating a method for a UE to directly allocate a sidelink transmission resource through sensing in a sidelink according to an embodiment of the disclosure.

FIG. 5 is a diagram illustrating a method for a UE to directly allocate a sidelink transmission resource through sensing in a sidelink according to an embodiment of the disclosure.

Hereinafter, a method for the UE to directly allocate the sidelink transmission resource through sensing in the sidelink will be referred to as Mode 2. In case of Mode 2, it may also be referred to as UE autonomous resource selection. In Mode 2, a base station 503 may provide a sidelink transmission/reception resource pool for V2X as system information, and a transmitting UE 501 may select a transmission resource in accordance with a predetermined rule. Unlike Mode 1 in which the base station directly participates in resource allocation, there is a difference in FIG. 5 in that the transmitting UE 501 autonomously selects resources and transmits data based on a resource pool previously received through the system information.

With reference to FIG. 5, the transmitting UE 501, which is camping on (505), and a receiving UE 502 may receive a SL-SIB from the base station 503 (step 510). Here, the receiving UE 502 indicates a UE receiving data transmitted by the transmitting UE 501. The SL-SIB information may include sidelink resource pool information for sidelink transmission/reception, parameter configuration information for sensing operation, information for configuring sidelink synchronization, or carrier information for sidelink transmission/reception operating at different frequencies.

A difference between FIG. 4 and FIG. 5 is that in FIG. 4 the base station 503 and the transmitting UE 501 operate in an RRC connected state, whereas in FIG. 5 the transmitting UE 501 may operate even in an idle mode 520 (in a state where RRC is not connected). Also, even in the RRC connected state 520, the base station 503 does not directly participate in resource allocation and may allow the transmitting UE 501 to autonomously select a transmission resource. Here, the RRC connection between the transmitting UE 501 and the base station 503 may be referred to as Uu-RRC 520. When data traffic for V2X is generated in the transmitting UE 501, the transmitting UE 501 may be configured with a resource pool through the system information received from the base station 503, and the transmitting UE 501 may directly select a resource in the time/frequency domain through sensing within the configured resource pool (step 530). When the resource is finally selected, the selected resource is determined as a grant for sidelink transmission.

In case of broadcast transmission, the transmitting UE 501 may perform transmission without RRC setup 515 for the sidelink. Contrary to this, in case of unicast or groupcast transmission, the transmitting UE 501 may perform RRC connection with another UE on a one-to-one basis. Here, the RRC connection between UEs may be referred to as PC5-RRC 515 to be distinguished from Uu-RRC. In case of groupcast, the PC5-RRC 515 may be individually connected between UEs in a group. With reference to FIG. 5, although the connection of the PC5-RRC 515 is shown as an operation after the transmission 510 of the SL-SIB, it may be performed at any time before the transmission 510 of the SL-SIB or before the transmission of the SCI.

Next, the transmitting UE 501 may transmit 1st stage SCI to the receiving UE 502 through the PSCCH (step 550). In addition, the transmitting UE 501 may transmit 2nd stage SCI to the receiving UE 502 through the PSSCH (step 560). In this case, the 1st stage SCI may contain information related to resource allocation, and the 2nd stage SCI may contain other control information. In addition, the transmitting UE 501 may transmit data to the receiving UE 502 through the PSSCH (step 570). The 1st stage SCI, the 2nd stage SCI, and the PSSCH may be transmitted together in the same slot.

Specifically, sidelink control information (SCI) used by the transmitting UEs 401 and 501 for sidelink communication with the receiving UEs 402 and 502 may be SCI format 1-A as the 1st stage SCI. In addition, there may be SCI format 2-A or SCI format 2-B as the 2nd stage SCI. In the 2nd stage SCI, SCI format 2-A may be used to include information for PSSCH decoding when HARQ feedback is not used or when HARQ feedback is used and includes both ACK and NACK information. In contrast, SCI format 2-B may be used to include information for PSSCH decoding when HARQ feedback is not used or when HARQ feedback is used and includes only NACK information. For example, SCI format 2-B may be limitedly used for groupcast transmission.

More specifically, SCI format 1-A may contain the following information and be indicated by the transmitting UEs 401 and 501 to the receiving UEs 402 and 502.

Priority

It is information indicating priority and may be composed of 3-bit information.

Frequency resource assignment

It is information for indicating a frequency resource allocation position and may include $$\left\lceil \log_2\left( \frac{N_{subChannel}^{SL}\left(N_{subChannel}^{SL} + 1\right)}{2} \right) \right\rceil$$

bit information when the number of maximum transmission reservation resources configured by a higher layer (resource pool) is 2. If the number of maximum transmission reservation resources configured by a higher layer (resource pool) is 3, $$\left\lceil \log_2\left( \frac{N_{subChannel}^{SL}\left(N_{subChannel}^{SL} + 1\right)\left(2N_{subChannel}^{SL} + 1\right)}{6} \right) \right\rceil$$

bit information may be included. Here, $$N_{subChannel}^{SL}$$

indicates the number of sub-channels configured in the resource pool.

Time resource assignment

It is information for indicating a time resource allocation position and may include 5-bit information when the number of maximum transmission reservation resources configured by a higher layer (resource pool) is 2. If the maximum number of transmission reservation resources configured by a higher layer (resource pool) is 3, 9-bit information may be included.

Resource reservation period

It is information for indicating periodic resource reservation and may include $\lceil \log_2(N_{reservPeriod}) \rceil$ bit information. Here, $N_{reservPeriod}$ represents the number of period values configured in a higher layer (resource pool). If the corresponding value is not configured in the higher layer (resource pool), it is determined that periodic resource reservation is not performed and may be configured with 0 bit.

DMRS pattern

It may indicate which DMRS pattern is transmitted among DMRS patterns configured in a higher layer (resource pool). It may include $\lceil \log_2(N_{pattern}) \rceil$ bit information. Here, $N_{pattern}$ indicates the number of DMRS patterns configured in the resource pool. If one pattern is configured, it may be configured with 0 bit.

2nd-stage SCI format

It may indicate whether the 2nd-stage SCI format is SCI format 2-A or SCI format 2-B. It may include 2-bit information, and bits reserved in consideration of the introduction of another 2nd-stage SCI format in the future may be included.

Beta_offset indicator

It may be indicated to determine RE mapping of the 2nd-stage SCI. It may include 2-bit information.

Number of DMRS port

It may indicate whether the number of DMRS ports is 1 or 2. It may include 1-bit information.

Modulation and coding scheme

It may indicate MCS. It may include 5-bit information.

Additional MCS table indicator

It may indicate which MCS table is used when a plurality of MCS tables are configured in a higher layer. When only one MCS table is configured in the higher layer, it may be configured with 0 bit.

PSFCH overhead

It may be indicated to determine PSCCH TBS. It may include 1-bit information when the PSFCH period is 2 or 4, and it may be configured with 0 bit when the PSFCH period is 0 or 1.

Reserved bits

Bits reserved for future use may be configured, and the number of corresponding bits may be determined by higher layer configuration.

Next, SCI format 2-A may contain the following information and be indicated by the transmitting UEs 401 and 501 to the receiving UEs 402 and 502.

HARQ process ID

HARQ process ID may be indicated. It may include $\lceil \log_2 N_{process} \rceil$ bit information may be included. Here, $N_{process}$ represents the number of HARQ processes.

New data indicator

It may indicate a new transport block (TB) or not. It may be composed of 1-bit information.

Redundancy version

It may indicate a redundancy version value, which is channel coding information, and may include 2-bit information.

Source ID

It may indicate the unique source ID of control information and data or the ID of a transmitting UE, and may include 8-bit information.

Destination ID

It may indicate the unique destination ID of control information and data or the ID of a receiving UE, and may include 16-bit information.

CSI request

It may indicate a CSI report request and may consist of 1-bit information.

HARQ feedback enabled/disabled

It may indicate activation/deactivation of HARQ feedback and may consist of 1-bit information.

Cast type indicator

It may indicate whether the transmission type is broadcast, unicast, or groupcast, and may be composed of 2-bit information.

Next, SCI format 2-B may contain the following information and be indicated by the transmitting UEs 401 and 501 to the receiving UEs 402 and 502.

HARQ process ID

It may indicate HARQ process ID. It may include $\lceil \log_2 N_{process} \rceil$ bit information. Here, $N_{process}$ represents the number of HARQ processes.

New data indicator

It may indicate a new transport block (TB) or not. It may be composed of 1-bit information.

Redundancy version

It may indicate a redundancy version value, which is channel coding information, and may include 2-bit information.

Source ID

It may indicate the unique source ID of control information and data or the ID of a transmitting UE, and may include 8-bit information.

Destination ID

It may indicate the unique destination ID of control information and data or the ID of a receiving UE, and may include 16-bit information.

Zone ID

Location information of the transmitting UE may be indicated in the form of a zone and may include 12-bit information.

Communication range requirement

Communication range information for determining whether to perform HARQ feedback may be included, and 4-bit information may be included.

HARQ feedback enabled/disabled

It may indicate activation/deactivation of HARQ feedback and may consist of 1-bit information.

In the disclosure, information that can be contained in SCI format 1-A, SCI format 2-A, and SCI format 2-B is not limited to the above-described information.

Figure 6:
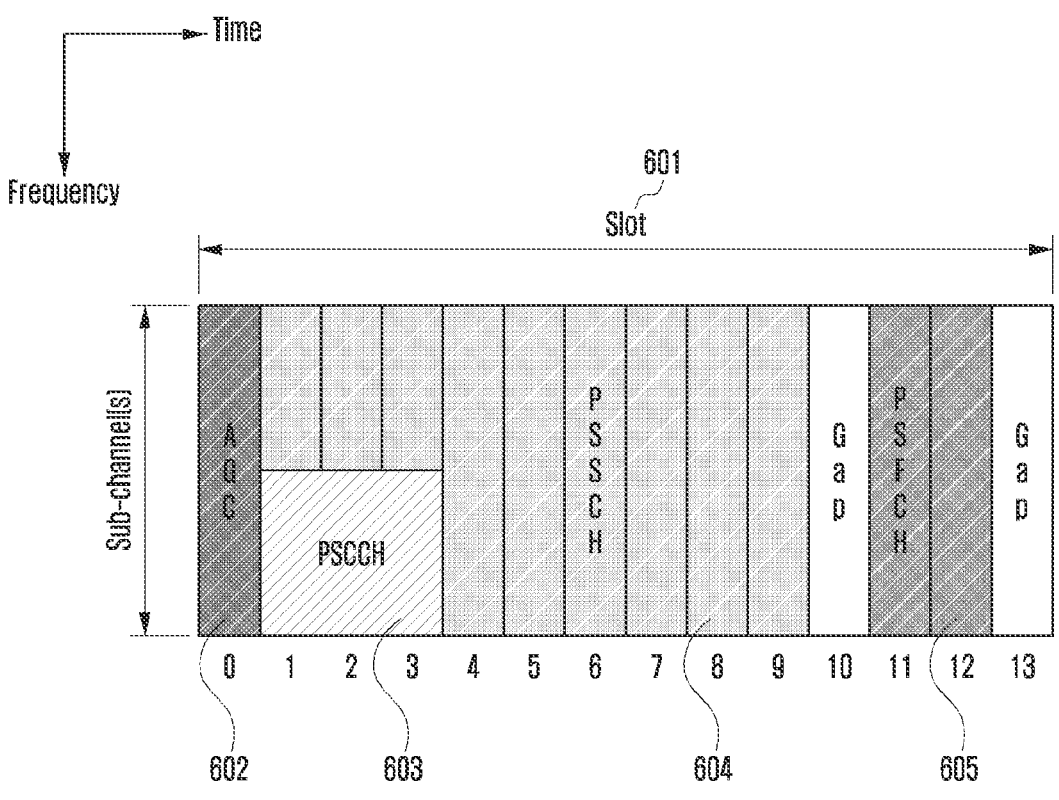
FIG. 6 is a diagram illustrating a mapping structure of physical channels mapped to one slot in a sidelink according to an embodiment of the disclosure.

FIG. 6 is a diagram illustrating a mapping structure of physical channels mapped to one slot in a sidelink according to an embodiment of the disclosure.

Specifically, FIG. 6 shows mapping to PSCCH/PSSCH/PSFCH physical channels. PSCCH/PSSCH/PSFCH may be allocated to one or more sub-channels in frequency domain. For details on sub-channel allocation, the description of FIG. 3 is referred to. Next, with reference to FIG. 6 to describe the time domain mapping of PSCCH/PSSCH/PSFCH, one or more symbols before a transmitting UE transmits PSCCH/PSSCH/PSFCH in a slot 601 may be used a region 602 for automatic gain control (AGC). When such symbol(s) is used for the AGC, a method for repetition transmission of a signal of any other channel in that symbol region may be considered. In this case, as a repetition signal of other channel, a part of PSCCH symbols or PSSCH symbols may be considered. Contrary to this, a preamble may be transmitted in the AGC region. In case that the preamble signal is transmitted, there is an advantage that an AGC execution time can be further shortened compared to the method for repetition transmission of other channel signal. In case that a preamble signal is transmitted for the AGC, a specific sequence may be used as the preamble signal 602, and in this case, a sequence such as PSSCH DMRS, PSCCH DMRS, CSI-RS, etc. may be used as the preamble. In the disclosure, the sequence used as the preamble is not limited to the above examples. Additionally, according to FIG. 6, a PSCCH 603 containing control information is transmitted in early symbols of the slot, and data scheduled by the control information of the PSCCH 603 may be transmitted through a PSSCH 604. A part (1st stage SCI) of sidelink control information (SCI), which is control information, may be mapped to and transmitted via the PSCCH 603. Another part (2nd stage SCI) of the SCI, which is control information, as well as data may be mapped to and transmitted via the PSSCH 604. In addition, FIG. 6 shows that a physical sidelink feedback channel (PSFCH) 605, which is a physical channel for transmitting feedback information, is located in the last part of the slot. A certain empty time (gap) between the PSSCH 604 and the PSFCH 605 may be secured so that a UE that has transmitted or received the PSSCH 604 can prepare to transmit or receive the PSFCH 605. Also, after transmission and reception of the PSFCH 605, another empty time (gap) may be secured.

FIGS. 7A to 7D are diagrams showing off-duration and on-duration of DRX determined depending on parameters configured for DRX when discontinuous reception (hereinafter, DRX) is performed in a sidelink according to an embodiment of the disclosure. Here, DRX on-duration may also be referred to as an active time for DRX. The UE may perform decoding on control information and data information in a section corresponding to on-duration of DRX. In contrast, the UE may not perform decoding on control information and data information in a section corresponding to off-duration of DRX. In the sidelink, there are 1st SCI, which is control information transmitted through PSCCH, and 2nd SCI, which is control information transmitted through PSSCH. Also, data information may be transmitted through the PSSCH. It may be assumed that control information and data information are always transmitted simultaneously in the sidelink. Therefore, a time point at which control information is received may be equal to a time point at which data information is received.

The following may be considered as parameters for determining off-duration and on-duration for DRX of the sidelink. However, in the disclosure, the parameters for determining the off-duration and on-duration of DRX are not limited to the parameters given below. Also, some of the parameters below may not be used in sidelink DRX.
DRX Related Parameters
  drx-cycle
    It indicates a cycle to which DRX is applied. For details on a method for configuring the cycle of DRX and a start position (drx-StartOffset) to which DRX is applied, refer to FIGS. 7A to 7D and the first embodiment. In the sidelink, the drx-cycle may have a long cycle and a short cycle. For a related configuration method, refer to the second embodiment.
  drx-onDurationTimer
    It indicates an operating time of DRX on-duration in drx-cycle, and control information and data information of sidelink can be decoded until the drx-onDurationTimer expires. For details on the drx-onDurationTimer, refer to FIGS. 7A to 7D. The method proposed in the first embodiment may be applied to configuration of the corresponding value.
  drx-InactivityTimer
    If sidelink control information is received before the drx-onDurationTimer expires, the on-duration of DRX may be extended from the time when the control information is received until the drx-InactivityTimer expires. For details on the drx-InactivityTimer, refer to FIGS. 7B to 7C. In addition, the method proposed in the first embodiment may be applied to configuration of the corresponding value.
  drx-HARQ-RTT-Timer
    In the case that retransmission is performed in the sidelink, if sidelink control information is received in the on-duration of DRX, the drx-HARQ-RTT-Timer may operate until the next retransmission is received. As described above, because location information of initial transmission and retransmission resources is indicated in the 1st SCI, the drx-HARQ-RTT-Timer may be assumed as a time gap between initial transmission and retransmission resources or a time gap between retransmission resources. For details on the drx-HARQ-RTT-Timer, refer to FIG. 7C. In addition, the method proposed in the first embodiment may be applied to configuration of the corresponding value.
  drx-RetransmissionTimer
    In the case that retransmission is performed in the sidelink, the drx-RetransmissionTimer may operate from the time when the drx-HARQ-RTT-Timer expires. It may be assumed that the drx-RetransmissionTimer does not operate during a time interval in which the drx-HARQ-RTT-Timer operates. Also, in the sidelink, the drx-RetransmissionTimer may be configured assuming a fixed value of one slot or one subframe. For details on the drx-RetransmissionTimer, refer to FIG. 7C. In addition, the method proposed in the first embodiment may be applied to configuration of the corresponding value.
  drx-SlotOffset
    In the case that a variety of subcarrier spacing (SCS) is supported, it may be used for the purpose of adjusting the start position to which DRX is applied. For details on this, refer to the first embodiment.
  WUS (wake-up signal) cycle
    It indicates a cycle of transmitting the WUS in the case that the WUS is used. For details, refer to FIG. 7D. Also, the method proposed in the first embodiment may be applied to configuration of the corresponding value.

Figure 7A:
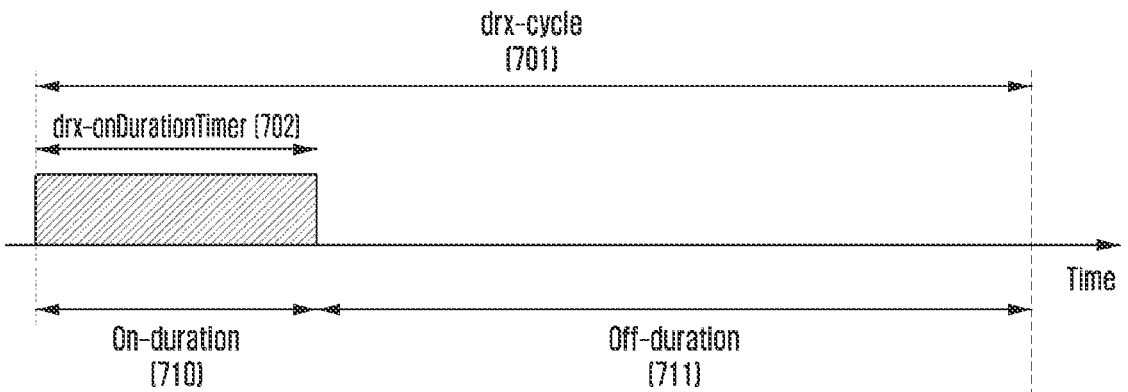
FIG. 7A is a diagram illustrating a first example of off-duration and on-duration of DRX determined depending on parameters configured for DRX according to an embodiment of the disclosure.

With reference to FIG. 7A, illustrated is an example in which off-duration and on-duration of DRX are determined through drx-cycle and drx-onDurationTimer. In FIG. 7A, when the drx-cycle 701 is started, a time interval from the start of the drx-onDurationTimer 702 to the expiration is configured as on-duration 710 of DRX, and the UE may receive sidelink control information during the time interval corresponding to the on-duration 710. The remaining drx-cycle interval from the expiration of the drx-onDurationTimer 702 is configured as off-duration 711 of DRX, and the UE may not receive control and data information during the time interval corresponding to the off-duration 711.

Figure 7B:
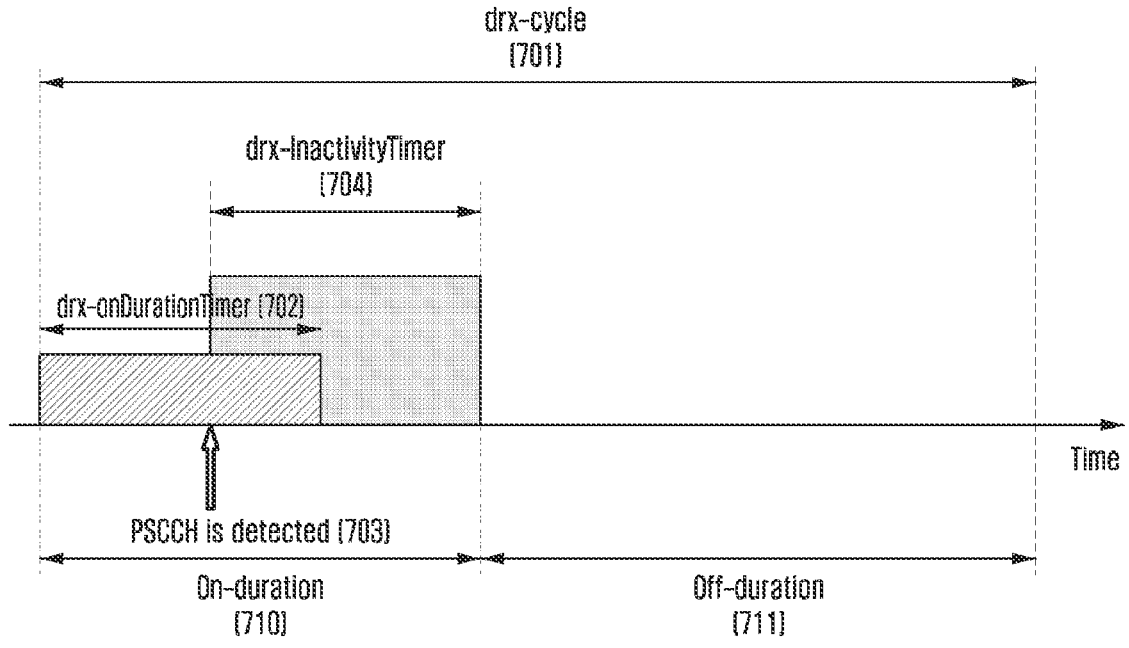
FIG. 7B is a diagram illustrating a second example of off-duration and on-duration of DRX determined depending on parameters configured for DRX according to an embodiment of the disclosure.

With reference to FIG. 7B, illustrated is an example in which off-duration and on-duration of DRX are determined through drx-cycle, drx-onDurationTimer, and drx-InactivityTimer. In FIG. 7B, when the drx-cycle 701 is started, a time interval from the start of the drx-onDurationTimer 702 to the expiration is configured as the on-duration 710 of DRX, and the UE may receive sidelink control information during the time interval corresponding to the on-duration 710. In the case 703 that sidelink control information is received through PSCCH in the DRX on-duration 710, the DRX on-duration 710 may be extended during a time interval in which the drx-InactivityTimer 704 started at that time point expires. If sidelink control information is not received until the end of the DRX on-duration 710, the remaining drx-cycle interval is configured as the off-duration 711 of DRX, and the UE may not receive control and data information during the time interval corresponding to the off-duration 711.

Figure 7C:
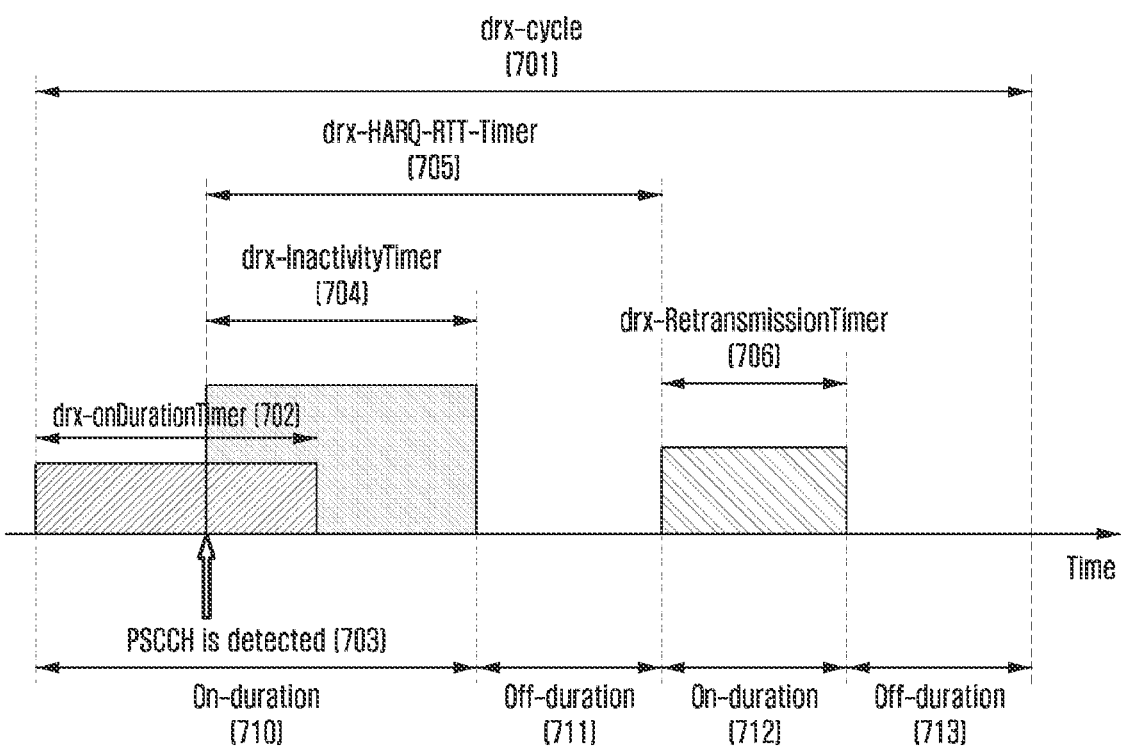
FIG. 7C is a diagram illustrating a third example of off-duration and on-duration of DRX determined depending on parameters configured for DRX according to an embodiment of the disclosure.

With reference to FIG. 7C, illustrated is an example in which off-duration and on-duration of DRX are determined using drx-HARQ-RTT-Timer and drx-HARQ-RTT-Timer. In FIG. 7C, when the drx-cycle 701 is started, a time interval from the start of the drx-onDurationTimer 702 to the expiration is configured as the on-duration 710 of DRX, and the UE may receive sidelink control information during the time interval corresponding to the on-duration 710. In the case 703 that sidelink control information is received through PSCCH in the DRX on-duration 710, the DRX on-duration 710 may be extended during a time interval in which the drx-InactivityTimer 704 started at that time point expires. If sidelink control information is not received until the end of the DRX on-duration 710, the remaining drx-cycle interval is configured as the off-duration 711 of DRX, and the UE may not receive control and data information during the time interval corresponding to the off-duration 711. Also, in the case 703 that sidelink control information is received through PSCCH in the DRX on-duration 710, information related to retransmission may be included as control information (refer to the control information included in the 1st SCI described above). Specifically, information on whether a retransmission resource is reserved and location information of a resource in which the retransmission resource is to be transmitted may be included. Thus, a time gap between initial transmission and retransmission resources or a time gap between retransmission resources included in the control information may be configured with a drx-HARQ-RTT-Timer 705. From a time point when the drx-HARQ-RTT-Timer 705 expires, the drx-RetransmissionTimer 706 may operate. Also, in the sidelink, the drx-RetransmissionTimer may be configured assuming a fixed value of one slot or one subframe. However, the disclosure is not limited to the above. That is, in the sidelink, the drx-RetransmissionTimer may be configured as one or more slots or one or more subframes. As shown in FIG. 7C, the interval in which the drx-RetransmissionTimer 706 operates is configured as the on-duration 712 of DRX, so that the UE can receive retransmitted data. In addition, the remaining drx-cycle interval is configured as the off-duration 713 of DRX, and the UE may not receive control and data information during the time interval corresponding to the off-duration 713.

Figure 7D:
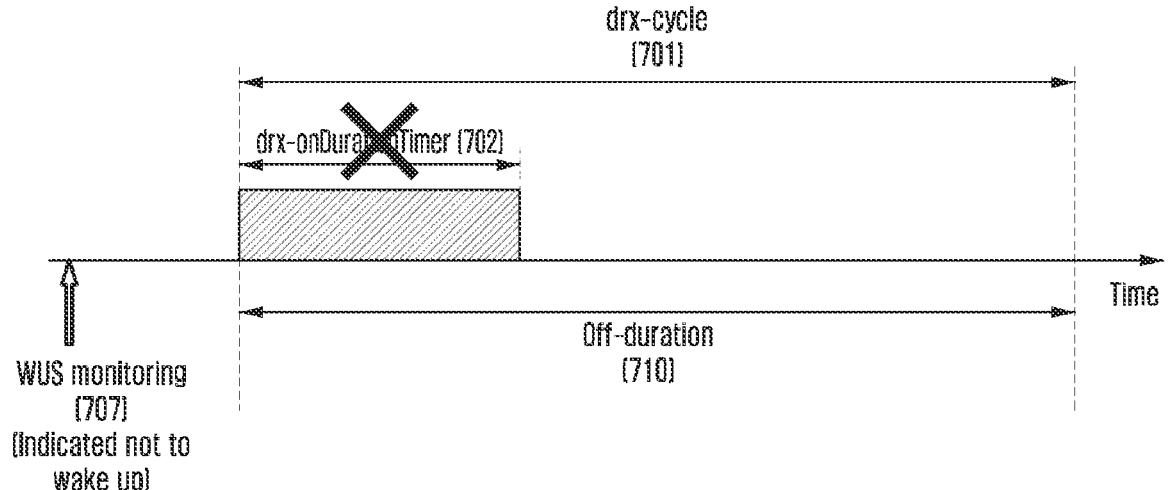
FIG. 7D is a diagram illustrating a fourth example of off-duration and on-duration of DRX determined depending on parameters configured for DRX according to an embodiment of the disclosure.

With reference to FIG. 7D, illustrated is an example in which off-duration and on-duration of DRX are determined using a wake-up signal (WUS). In the case that the WUS is used in the sidelink, a cycle in which the WUS is transmitted may be configured. The UE may perform monitoring 707 for the WUS at a location where the WUS is transmitted. As in 707 of FIG. 7D, if the WUS indicates that the UE does not wake up, the UE does not operate the drx-onDurationTimer 702 in the drx-cycle 701 and the entire drx-cycle interval is configured as the off-duration 710 of DRX so that the UE may not receive control and data information. On the other hand, if the WUS indicates in 707 that the UE wakes up, the UE may perform the operation shown in FIG. 7A, FIG. 7B, or FIG. 7C depending on the configured DRX parameter.

Proposed in the first embodiment below are a configuration relationship between a resource pool and parameters necessary for performing discontinuous reception (hereinafter referred to as DRX) in the sidelink, a time interval configuration method of the DRX parameters, and methods for determining a start position to which the DRX cycle is applied. In addition, in the second embodiment, various methods for enabling the DRX-related parameters to be aligned between sidelink UEs are proposed. Next, in the third embodiment, a DRX operation method in consideration of sensing and resource selection operations in the sidelink Mode2 operation is proposed. Finally, in the fourth embodiment, a DRX operation method is proposed in the case that inter-UE coordination is performed in the sidelink. Note that the following embodiments may be used in combination with each other in the disclosure.

First Embodiment

In the first embodiment, a configuration relationship between a resource pool and parameters necessary for performing discontinuous reception (hereinafter referred to as DRX) in the sidelink, a time interval configuration method of the DRX parameters, and methods for determining a start position to which the DRX cycle is applied are proposed. As the DRX parameters to be considered, refer to the DRX-related parameters described above. Note that the off-duration and on-duration of the sidelink DRX may vary according to the proposed methods.

First, the off-duration and on-duration of DRX may be determined differently depending on the configuration relationship between DRX-related parameters and the sidelink resource pool. The resource pool of the sidelink may be a reception pool (RX pool) or a transmission pool (TX pool). Examples of the disclosure are described considering the reception pool (RX pool), but this is not a limitation. That is, the transmission pool (TX pool) may also be considered. For details on the sidelink resource pool, refer to FIG. 3 above. In the sidelink, a plurality of transmission pools (TX pools) and a plurality of reception pools (RX pools) may be in (pre-)configuration in the UE. Specifically, in the UE of the sidelink, X (e.g., 8) transmission pools may be configured, and Y (e.g., 16) reception pools may be configured. In addition, X transmission pools and Y reception pools may be configured for a resource pool that is in configuration in a cell-common or UE-specific manner with the pre-configuration resource pool. Assuming that FIG. 3 is the description of one resource pool, different resource pools may be in (pre-)configuration to different time resource locations within sidelink transmittable slots and different frequency locations within sidelink BWP.

Figure 8A:
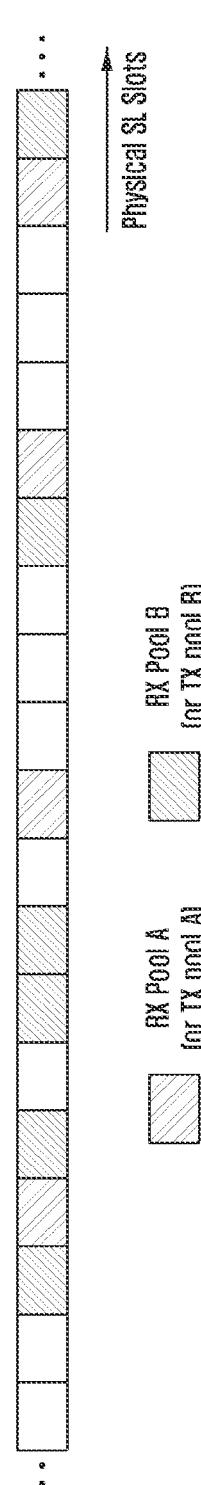
FIG. 8A is a diagram illustrating an example of a case in which two resource pools are configured in different time resource locations according to an embodiment of the disclosure.
Figure 8B:
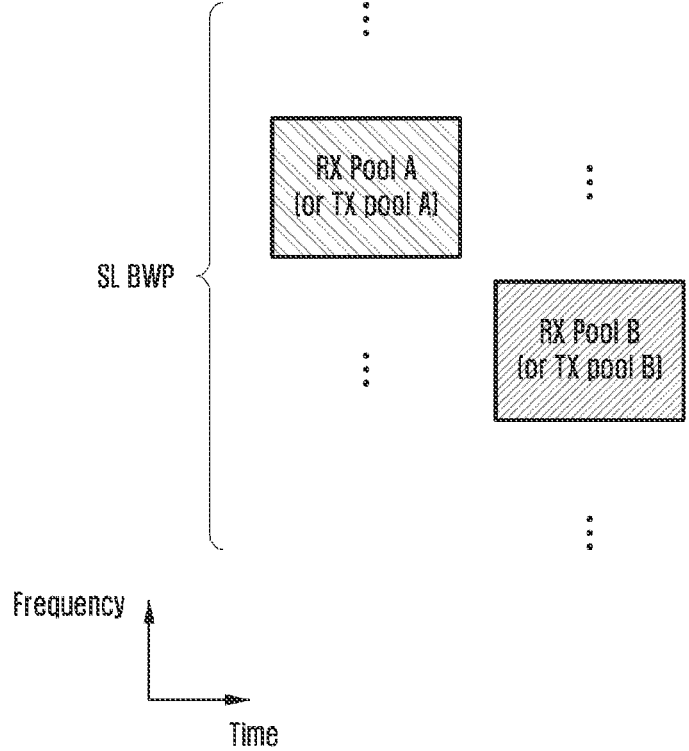
FIG. 8B is a diagram illustrating an example of a case in which two resource pools are configured in different time and frequency resource locations according to an embodiment of the disclosure.
Figure 8C:
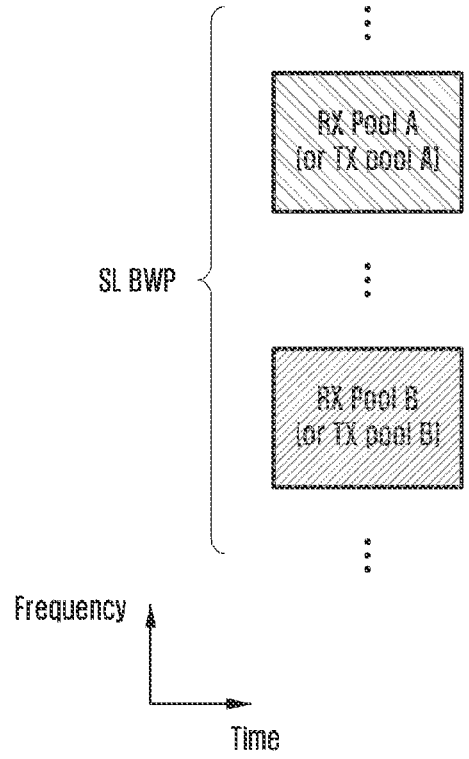
FIG. 8c is a diagram illustrating an example of a case in which two resource pools are configured in different frequency resource locations according to an embodiment of the disclosure.

FIGS. 8A to 8C are diagrams illustrating a mapping structure in which a plurality of resource pools are configured and mapped to time and frequency according to an embodiment of the disclosure.

With reference to FIG. 8A, a case in which two resource pools are allocated to different time resource locations is illustrated. A case in which two resource pools are distinguished only in time and frequency resources are allocated at the same location as shown in FIG. 8A and a case in which frequency resources are also allocated to different frequency resources in the sidelink BWP may be considered.

With reference to FIG. 8B, a case in which two resource pools are distinguished and configured in both time and frequency is illustrated.

Finally, with reference to FIG. 8C, a case in which two resource pools are allocated to the same time resource location and to different frequency resource locations in the sidelink BWP is illustrated.

Therefore, the following methods may be considered as a configuration relationship between the DRX-related parameters and the sidelink resource pool proposed in this embodiment. Note that the disclosure is not limited to the following methods as the configuration relationship between the DRX-related parameters and the sidelink resource pool. It is also noted that a combination of the following methods may be used.

Relationship Between DRX-Related Parameters and Sidelink Resource Pool

Method 1: DRX-related parameters are configured for each resource pool

Method 2: DRX-related parameters are configured for a resource pool group

Method 3: DRX-related parameters are configured for all resource pools

The method 1 is a method in which DRX-related parameters are configured per resource pool, and different DRX operations may be made for each resource pool. In the method 1, different DRX configurations are made per pool, so that DRX on/off duration may be irregularly generated. In order to alleviate this problem, the method 2 restricts DRX-related parameters to be configured per resource pool group. In the case of method 1, DRX may be activated or deactivated for each resource pool, and a desired DRX parameter configuration may be operated for the DRX-activated resource pool. In the case of method 2, DRX may be activated or deactivated for each resource pool group, and a desired DRX parameter configuration may be operated for the DRX-activated resource pool group. When the DRX parameter configuration is operated as in the method 1 or the method 2, there may be various advantages. For example, a case in which a plurality of resource pools are distinctively operated depending on a sidelink service may be considered. In this case, depending on the sidelink service, DRX operation may or may not be necessary, and when the DRX operation is required, DRX off-duration and on-duration may be configured to suit the corresponding service. In addition, when a plurality of resource pools are distinguished at frequency positions within the sidelink BWP as in FIG. 8B or 8C, by operating DRX through the method 1 or the method 2 for the plurality of resource pools, it is possible to control that a specific frequency region is not used in a specific time region. Also, a method in which DRX is not operated in pre-configuration resource pools may be considered. In other words, DRX may be operated only for a resource pool that is in configuration in a cell-common or UE-specific manner. The method 3 is a method in which DRX parameters are configured for all resource pools, and compared to the method 1 or the method 2, DRX operation can be simplified and irregular occurrence of DRX on/off duration can be reduced.

In addition, a method in which DRX-related parameters are configured in a sidelink carrier or configured in a sidelink BWP may be considered. One or multiple sidelink BWPs may be defined in the sidelink carrier. Here, the carrier may be replaced with the meaning of the cell.

First, a method in which DRX-related parameters are configured for a sidelink carrier may be considered. If only one carrier is considered in the sidelink, and if DRX-related parameters are configured for the corresponding carrier, DRX parameters may be configured for all resource pools of the corresponding carrier as in the method 3. However, if multiple carriers such as carrier aggregation are used in the sidelink, DRX-related parameters may be configured differently for each carrier. In this case, a method of restricting DRX-related parameter configuration may be considered. It may also be restricted so that different DRX-related parameter configurations are possible only for X (e.g., X=2) carrier groups.

Next, a method in which DRX-related parameters are configured for a sidelink BWP may be considered. Because the resource pool configuration of the sidelink (one or multiple resource pool configurations) can be defined for the sidelink BWP, DRX-related parameters may be configured for all resource pools in the corresponding sidelink BWP as in the method 3 when only one sidelink BWP is defined. However, if a plurality of sidelink BWPs are supported, and if a method in which DRX-related parameters are configured for the sidelink BWP is used, the resource pool(s) defined in each sidelink BWP may have the same DRX parameter configuration, but DRX-related parameters may be configured differently in other sidelink BWPs. In this case, a method of restricting DRX-related parameter configurations may be considered. It may also be restricted so that different DRX-related parameter configurations are possible for X (e.g., X=2) sidelink BWP groups.

Next, the following methods may be considered as a time interval configuration method of DRX parameters proposed in this embodiment. Note that the disclosure is not limited to the following methods as the time interval configuration method of DRX parameters. It is also noted that a combination of the following methods may be used.

Time Interval Configuration Method of DRX Parameters

Method 1: Configure in units of ms

Method 2: Configure in units of physical slots

Method 3: Configure in units of logical slots

The method for configuring a time interval of DRX parameters may be applied to the DRX-related parameters proposed above. For a detailed description of the methods, refer to FIG. 9.

In the disclosure, the following methods may be considered as a method for determining a start position (drx-StartOffset) to which a DRX cycle is applied, together with the method for configuring the time interval of the DRX parameters. Note that the disclosure is not limited to the following methods for the start position to which the DRX cycle is applied in time. It is also noted that a combination of the following methods may be used.

Start Position where DRX Cycle is Applied

Method 1: Determined by subframe number

Method 2: Determined by slot number

Method 3: Determined by subframe number and resource pool start position

Method 4: Determined by slot number and resource pool start position

For a detailed description of the above methods, refer to FIG. 9. If the start position (drx-StartOffset) to which the DRX cycle is applied is determined by the method 1, the following Equation may be used.

$$[(SFN \times 10) + \text{subframe number}] \ \text{modulo(drx-Cycle)} \qquad \text{[Equation 1]}$$

In Equation 1, it is assumed that drx-cycle is defined as ms, and when a method other than ms is used among the time interval configuration methods of the DRX parameters, the above Equation may be modified.

If the start position (drx-StartOffset) to which the DRX cycle is applied is determined by the method 2, the following Equation may be used.

$$[(SFN \times N_{slot}^{frame,\mu}) + \text{slot number within a frame}] \qquad \text{Equation 2}$$
$$\text{modulo drx-Cycle})$$

In Equation 2, it is assumed that the drx-cycle is defined as ms, and when a method other than ms is used among the time interval configuration methods of the DRX parameters, the above Equation may be modified. Also, in Equation 2, μ is an index corresponding to SCS, which is a numerology, and has a value of μ={0, 1, 2, 3, 4} for SCS={15, 30, 60, 120}, respectively. For the value of $$N_{slot}^{frame,\mu},$$

refer to Table 1 below.

TABLE 1

| μ | $N_{slot}^{frame,\ \mu}$ |
|---|---|
| 0 | 10 |
| 1 | 20 |
| 2 | 40 |
| 3 | 80 |
| 4 | 160 |

In the sidelink, a frame may use a system frame number (SFN) or a direct frame number (DFN), and the DFN may be determined by the following Equation.

DFN=Floor(0.1*(Tcurrent−Tref−offsetDFN))mod 1024

SubframeNumber=Floor(Tcurrent−Tref−offsetDFN) mod 10      [Equation 3]

In Equation 3, Tcurrent, Tref, and offsetDFN may be defined as follows.

Tcurrent is the current UTC time that obtained from GNSS. This value is expressed in milliseconds;

Tref is the reference UTC time 00:00:00 on Gregorian calendar date 1 Jan. 1900 (midnight between Thursday, Dec. 31, 1899 and Friday, Jan. 1, 1900). This value is expressed in milliseconds;

OffsetDFN is the value sl-OffsetDFN if configured, otherwise it is zero. This value is expressed in milliseconds.

FIGS. 9A to 9H are diagrams showing examples of a method in which DRX is performed in a sidelink, depending on the configuration relationship between a resource pool and DRX parameters, the time interval configuration method of the DRX parameters, and the methods for determining a start position to which the DRX cycle is applied, which are proposed above. Note that, although FIGS. 9A to 9H show only drx-cycle and drx-onDurationTimer among the DRX parameters that can be configured, the parameters are not limited thereto. Also, note that, although only two resource pools are shown in FIG. 9 and only the methods 1 and 3 described in the relation between the DRX-related parameters and the sidelink resource pool are shown, the disclosure is not limited thereto. In addition, it is noted that, although the focus is on the methods 1 and 3 described in the method for configuring the time interval of the DRX parameters, the disclosure is not limited thereto.

Figure 9A:
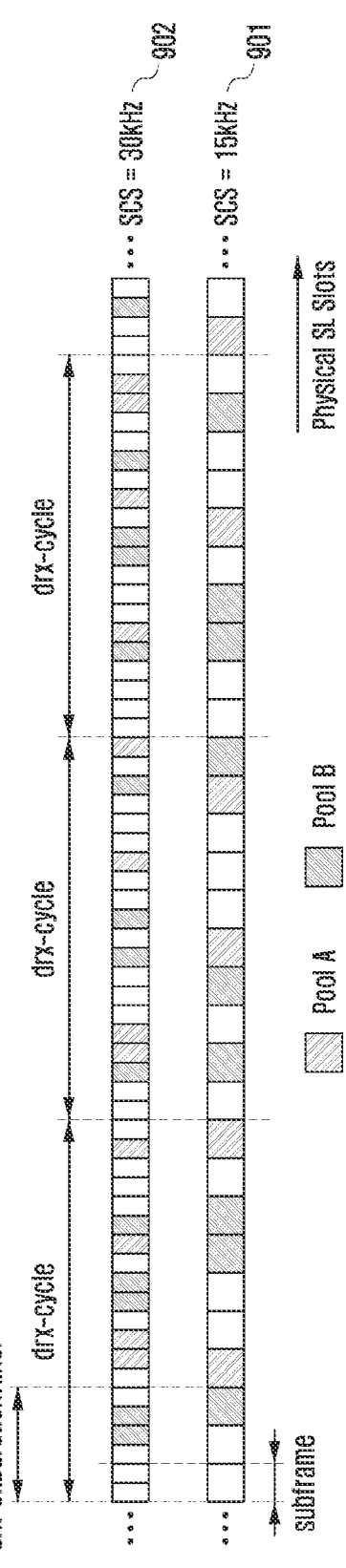
FIG. 9A is a diagram illustrating a first example of a method in which DRX is performed in a sidelink according to an embodiment of the disclosure.

With reference to FIG. 9A, shown is a case of using the method 3 (for all pool) regarding the relationship between DRX-related parameters and sidelink resource pool, the method 1 (ms) regarding the time interval configuration method of DRX parameters, and the method 1 (subframe number) regarding the start position to which the DRX cycle is applied. 901 denotes a case of SCS=15 kHz, and 902 denotes a case of SCS=30 kHz.

In a case of using the method 3 (for all pool) regarding the relationship between DRX-related parameters and sidelink resource pool, the method 1 (ms) regarding the time interval configuration method of DRX parameters, and the method 2

(slot number) regarding the start position to which the DRX cycle is applied, it may be equally shown as 901 of FIG. 9A for SCS=15 kHz and 902 of FIG. 9A for SCS=30 kHz.

Figure 9B:
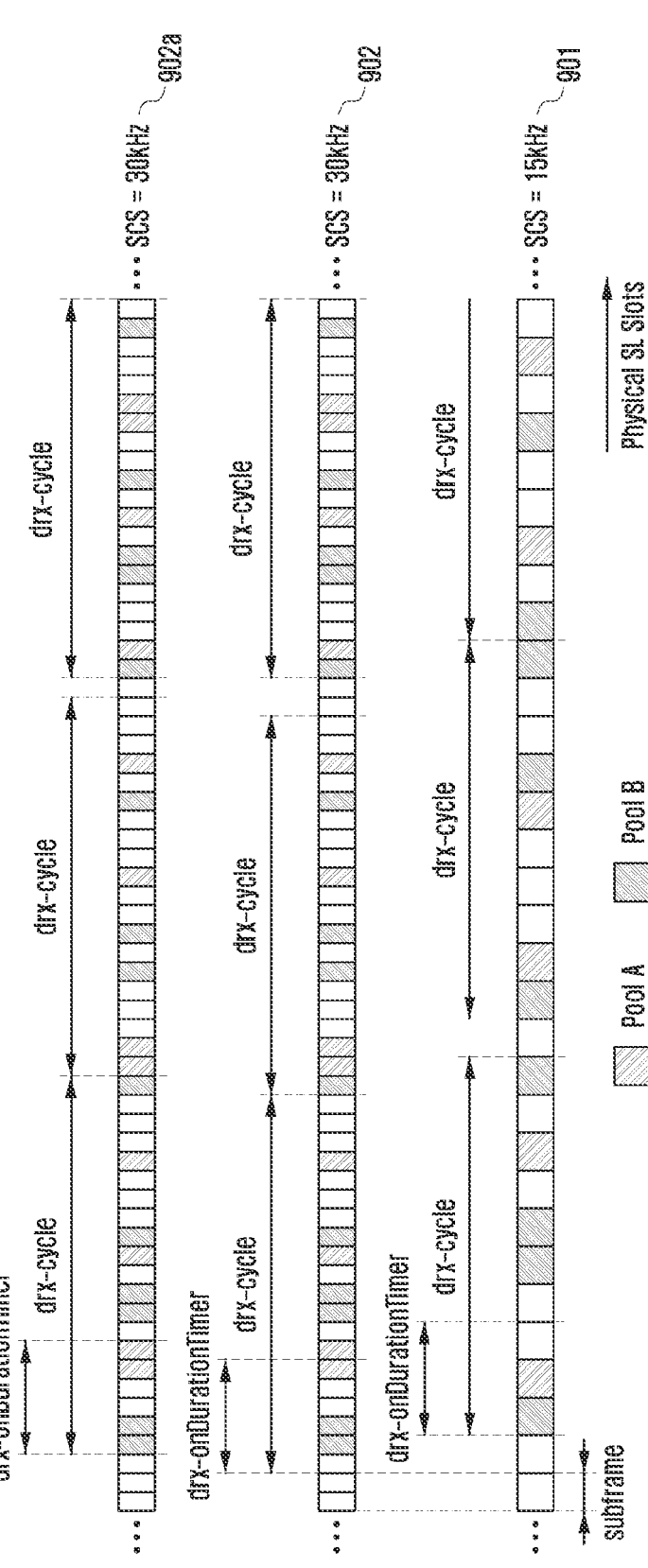
FIG. 9B is a diagram illustrating a second example of a method in which DRX is performed in a sidelink according to an embodiment of the disclosure.

With reference to FIG. 9B, shown is a case of using the method 3 (for all pool) regarding the relationship between DRX-related parameters and sidelink resource pool, the method 1 (ms) regarding the time interval configuration method of DRX parameters, and the method 3 (subframe number and resource pool start position) regarding the start position to which the DRX cycle is applied. 901 denotes a case of SCS=15 kHz, and 902 denotes a case of SCS=30 kHz.

In a case of using the method 3 (for all pool) regarding the relationship between DRX-related parameters and sidelink resource pool, the method 1 (ms) regarding the time interval configuration method of DRX parameters, and the method 4 (slot number and resource pool start position) regarding the start position to which the DRX cycle is applied, it may be shown as 901 of FIG. 9B for SCS=15 kHz and 902a of FIG. 9B for SCS=30 kHz.

Figure 9C:
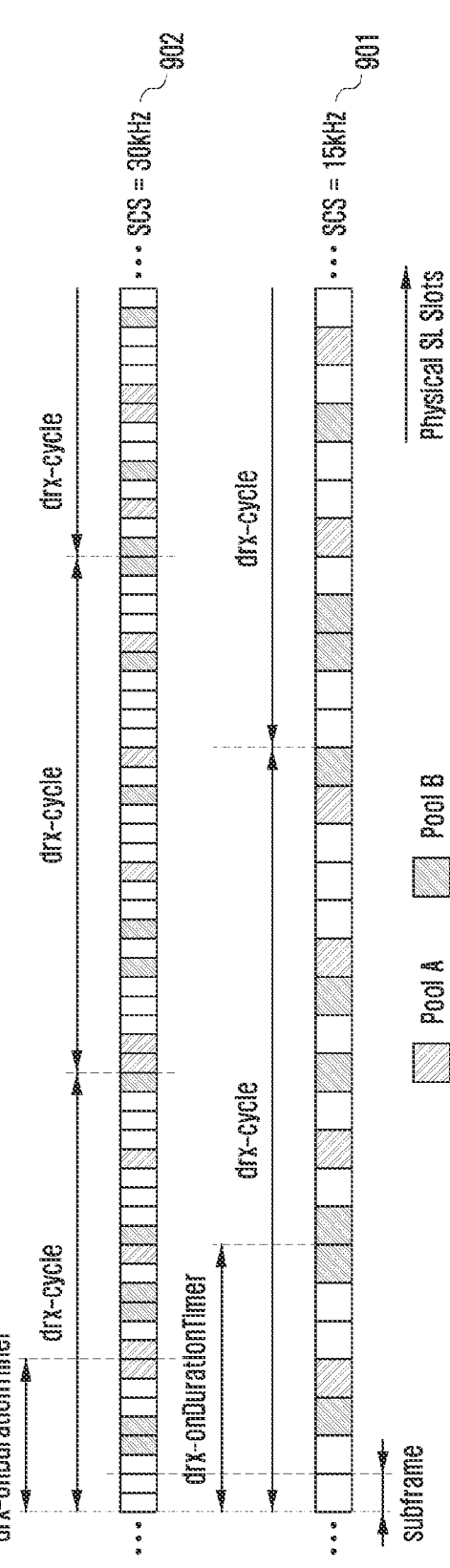
FIG. 9C is a diagram illustrating a third example of a method in which DRX is performed in a sidelink according to an embodiment of the disclosure.

With reference to FIG. 9C, shown is a case of using the method 3 (for all pool) regarding the relationship between DRX-related parameters and sidelink resource pool, the method 3 (logical slot) regarding the time interval configuration method of DRX parameters, and the method 1 (subframe number) regarding the start position to which the DRX cycle is applied. 901 denotes a case of SCS=15 kHz, and 902 denotes a case of SCS=30 kHz.

In a case of using the method 3 (for all pool) regarding the relationship between DRX-related parameters and sidelink resource pool, the method 3 (logical slot) regarding the time interval configuration method of DRX parameters, and the method 2 (slot number) regarding the start position to which the DRX cycle is applied, it may be equally shown as 901 of FIG. 9C for SCS=15 kHz and 902 of FIG. 9C for SCS=30 kHz.

Figure 9D:
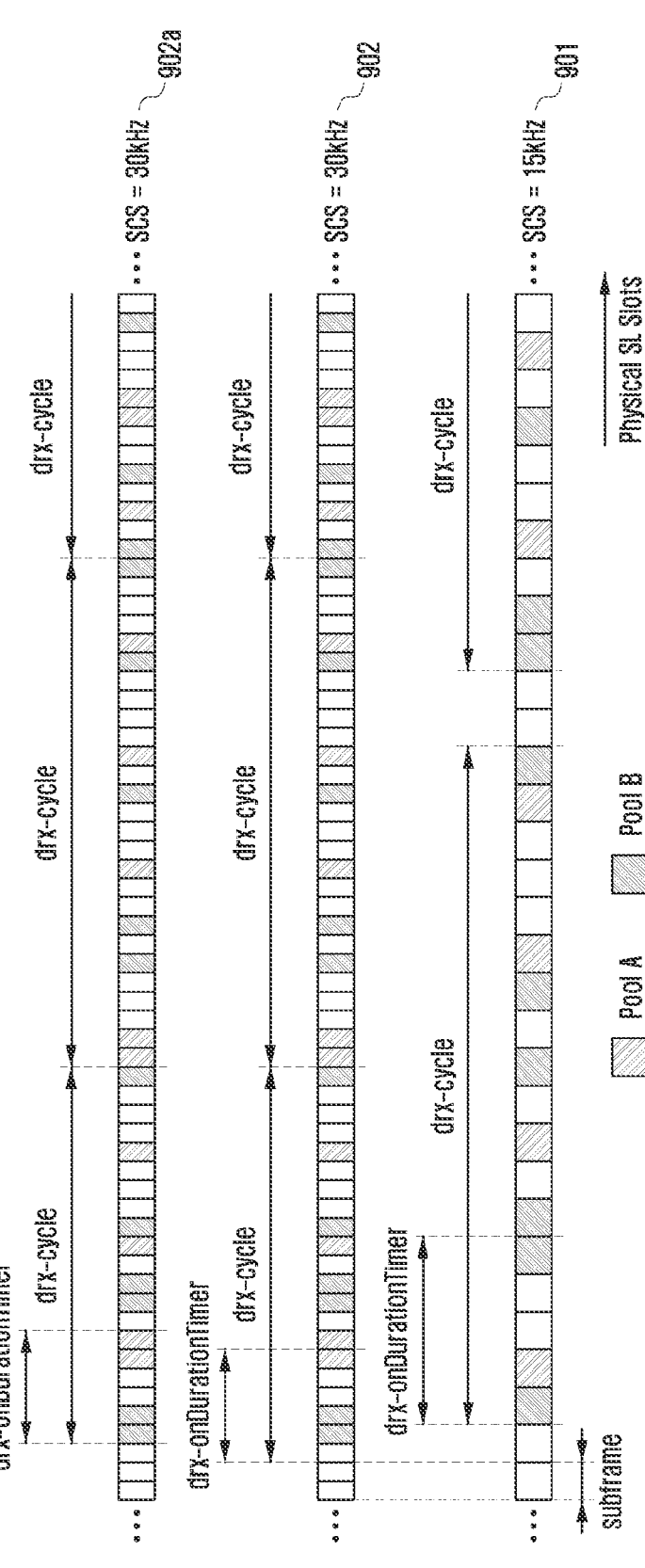
FIG. 9D is a diagram illustrating a fourth example of a method in which DRX is performed in a sidelink according to an embodiment of the disclosure.

With reference to FIG. 9D, shown is a case of using the method 3 (for all pool) regarding the relationship between DRX-related parameters and sidelink resource pool, the method 3 (logical slot) regarding the time interval configuration method of DRX parameters, and the method 3 (subframe number and resource pool start position) regarding the start position to which the DRX cycle is applied. 901 denotes a case of SCS=15 kHz, and 902 denotes a case of SCS=30 kHz.

In a case of using the method 3 (for all pool) regarding the relationship between DRX-related parameters and sidelink resource pool, the method 3 (logical slot) regarding the time interval configuration method of DRX parameters, and the method 4 (slot number and resource pool start position) regarding the start position to which the DRX cycle is applied, it may be shown as 901 of FIG. 9D for SCS=15 kHz and 902a of FIG. 9D for SCS=30 kHz.

Figure 9E:
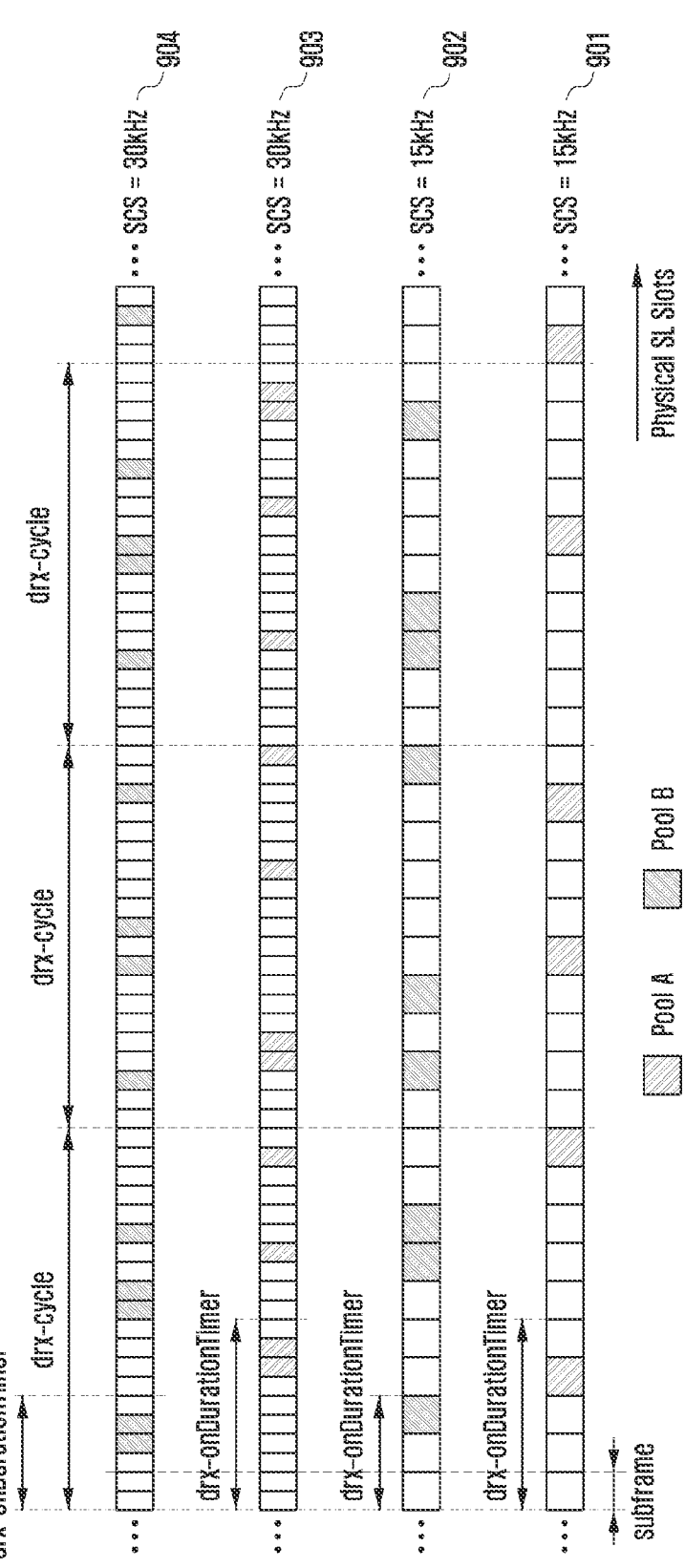
FIG. 9E is a diagram illustrating a fifth example of a method in which DRX is performed in a sidelink according to an embodiment of the disclosure.

With reference to FIG. 9E, shown is a case of using the method 1 (per pool) regarding the relationship between DRX-related parameters and sidelink resource pool, the method 1 (ms) regarding the time interval configuration method of DRX parameters, and the method 1 (subframe number) regarding the start position to which the DRX cycle is applied. 901 and 902 denote a case of SCS=15 kHz, and 903 and 904 denote a case of SCS=30 kHz.

In a case of using the method 1 (per pool) regarding the relationship between DRX-related parameters and sidelink resource pool, the method 1 (ms) regarding the time interval configuration method of DRX parameters, and the method 2 (slot number) regarding the start position to which the DRX cycle is applied, it may be equally shown as 901 and 902 of FIG. 9E for SCS=15 kHz and 903 and 904 of FIG. 9E for SCS=30 kHz.

Figure 9F:
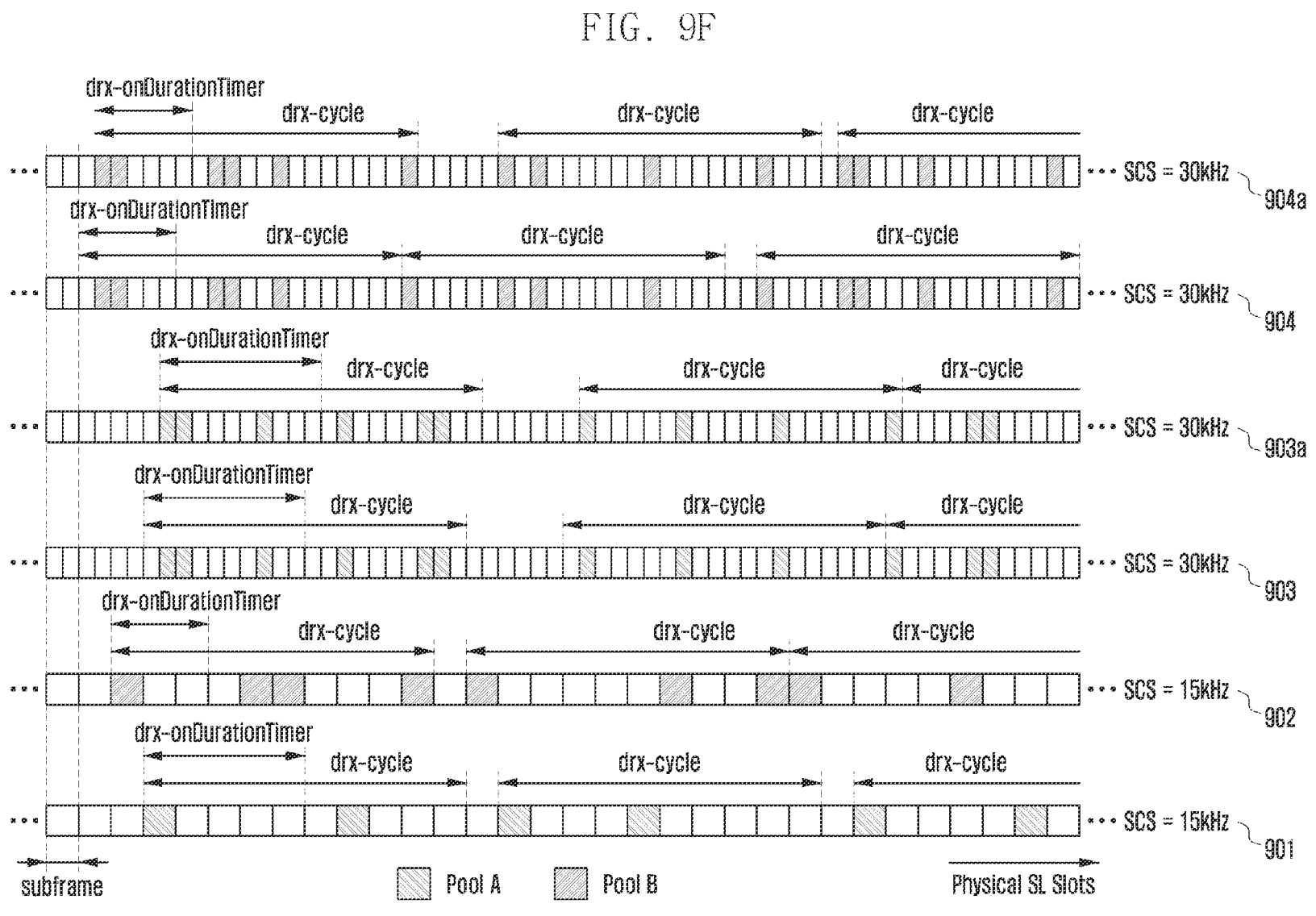

With reference to FIG. 9F, shown is a case of using the method 1 (per pool) regarding the relationship between DRX-related parameters and sidelink resource pool, the method 1 (ms) regarding the time interval configuration method of DRX parameters, and the method 3 (subframe number and resource pool start position) regarding the start position to which the DRX cycle is applied. 901 and 902 denote a case of SCS=15 kHz, and 903 and 904 denote a case of SCS=30 kHz.

In a case of using the method 1 (per pool) regarding the relationship between DRX-related parameters and sidelink resource pool, the method 1 (ms) regarding the time interval configuration method of DRX parameters, and the method 4 (slot number and resource pool start position) regarding the start position to which the DRX cycle is applied, it may be shown as 901 and 902 of FIG. 9F for SCS=15 kHz and 903*a* and 904*a* of FIG. 9F for SCS=30 kHz.

Figure 9G:
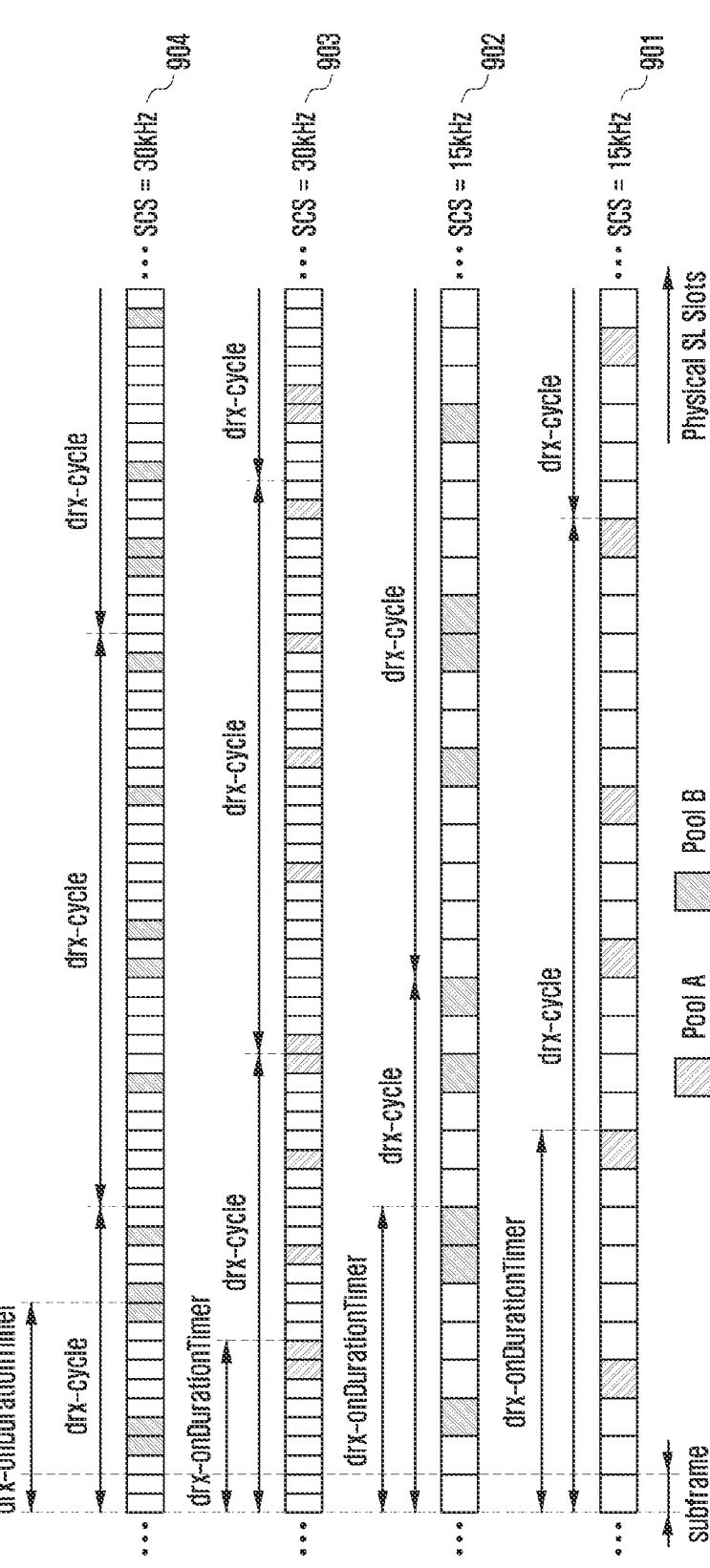
FIG. 9G is a diagram illustrating a seventh example of a method in which DRX is performed in a sidelink according to an embodiment of the disclosure.

With reference to FIG. 9G, shown is a case of using the method 1 (per pool) regarding the relationship between DRX-related parameters and sidelink resource pool, the method 3 (logical slot) regarding the time interval configuration method of DRX parameters, and the method 1 (subframe number) regarding the start position to which the DRX cycle is applied. 901 and 902 denote a case of SCS=15 kHz, and 903 and 904 denote a case of SCS=30 kHz.

In a case of using the method 1 (per pool) regarding the relationship between DRX-related parameters and sidelink resource pool, the method 3 (logical slot) regarding the time interval configuration method of DRX parameters, and the method 2 (slot number) regarding the start position to which the DRX cycle is applied, it may be equally shown as 901 and 902 of FIG. 9G for SCS=15 kHz and 903 and 904 of FIG. 9G for SCS=30 kHz.

Figure 9H:
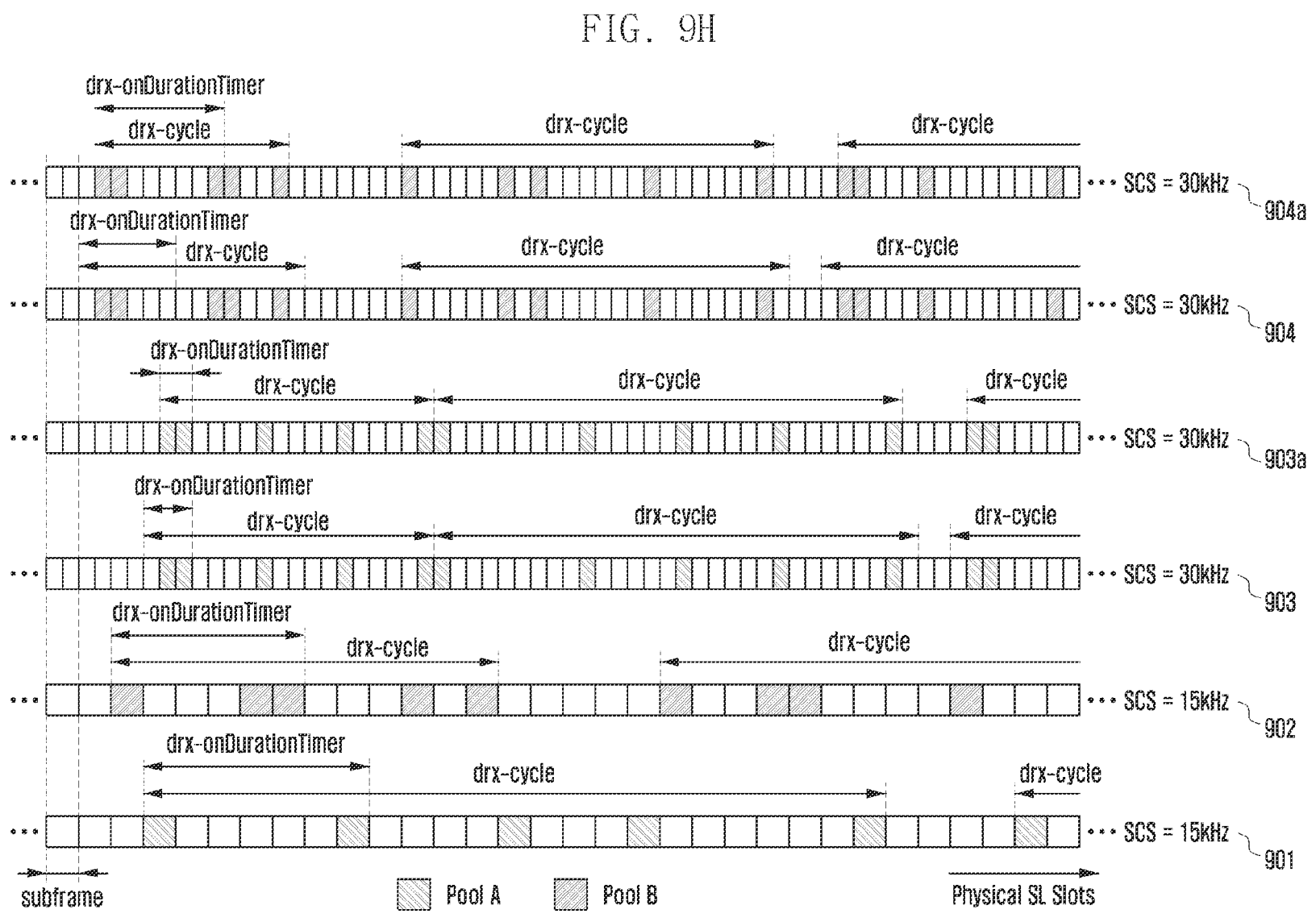

With reference to FIG. 9H, shown is a case of using the method 1 (per pool) regarding the relationship between DRX-related parameters and sidelink resource pool, the method 3 (logical slot) regarding the time interval configuration method of DRX parameters, and the method 3 (subframe number and resource pool start position) regarding the start position to which the DRX cycle is applied. 901 and 902 denote a case of SCS=15 kHz, and 903 and 904 denote a case of SCS=30 kHz.

In a case of using the method 1 (per pool) regarding the relationship between DRX-related parameters and sidelink resource pool, the method 3 (logical slot) regarding the time interval configuration method of DRX parameters, and the method 4 (slot number and resource pool start position) regarding the start position to which the DRX cycle is applied, it may be shown as 901 and 902 of FIG. 9H for SCS=15 kHz and 903*a* and 904*a* of FIG. 9H for SCS=30 kHz.

Second Embodiment

In the second embodiment, various methods of configuring parameters necessary for performing discontinuous reception (DRX) between UEs in the sidelink to be aligned between the sidelink UEs are proposed. In other words, only when DRX-related configuration is equally understood between UEs performing communication in the sidelink, transmission/reception between UEs can be performed without any problem. For configurable DRX parameters, refer to the DRX-related parameters described above.

The disclosure proposes the following as methods for configuring DRX parameters so that DRX-related configuration is equally understood between UEs performing communication in the sidelink. Note that the following methods may be used in combination.

Method for Configuring DRX Parameters

Method 1: DRX parameters are pre-configured via resource pool information or configured in cell-common.

Method 2: DRX parameter is configured in a UE-specific manner via resource pool information.

Method 3: DRX parameter is indicated via L1 signaling.

Method 4: DRX parameter is configured via PC5-RRC.

In the case of method 1, the resource pool information is pre-configured in the UE or configured in cell-common through SL SIB of the base station, so that the DRX parameter is configured equally to a method in which the UE performs sidelink transmission and reception in a resource pool. In the case of method 1, all UEs belonging to the corresponding pool may have the same DRX parameter configuration information and perform transmission/reception. In the case where only the method 2 is considered, it may not be used because different DRX parameters may be configured between UEs. However, the method 2 may be considered to be used together with the method 3 or the method 4.

The method 3 is a method of configuring DRX parameter information via L1 signaling. The L1 signaling may be indicated through the 1st SCI, indicated through the 2nd SCI, or indicated through the WUS signal. In addition, a set of DRX parameters that can be indicated through L1 signaling may be configured by the method 1 or the method 2. Specifically, the following methods of indicating DRX parameter information via L1 signaling may be considered. Note that the disclosure is not limited to only the following methods, and a combination of the following methods may be used.

Method for Indicating DRX Parameter Information Via L1 Signaling

Method 3-1: Indicate a short-drx-cycle via L1 signaling

Method 3-2: Indicate a DRX parameter in a UE-specific manner via L1 signaling

In the case of method 3-1, a long-drx-cycle may assume the longest drx-cycle among configurable drx-cycles as a default drx-cycle or may be configured through the method 1. Also, if needed by the UE, a short-drx-cycle is indicated via L1 signaling. Through this method, the UE may perform DRX operation in a short cycle. In the case of method 3-2, a specific value among configurable DRX parameters may be assumed as a default value, or a DRX parameter may be configured through the method 1. In addition, the DRX parameter may be configured in a UE-specific manner via L1 signaling. In the method 3-2, the DRX parameter that can be indicated via L1 signaling is not limited to a specific parameter. In the case that the method 3 is used and the UE receives L1 signaling indicating different drx-cycles from multiple UEs in the sidelink, the UE may assume a short drx-cycle. Also, in the case that the method 3 is used and the UE receives L1 signaling indicating different DRX parameters from multiple UEs in the sidelink, the UE may assume a DRX parameter based on priority. Specifically, a DRX parameter transmitted by a UE corresponding to a higher priority may be assumed. In this case, the priority may be priority information included in the 1st SCI. Alternatively, the priority may be newly defined and signaled information, unlike the existing priority value included in the 1st SCI.

In addition, the method 4 is a method in which DRX parameter information is configured through PC5-RRC. In the case of method 4, two operating methods may be considered. The first method is a case in which the configuration of DRX parameter information is supported only through PC5-RRC without support of the methods 1, 2, and 3. In this case, when a PC5-RRC link between UEs is formed as in unicast, sidelink DRX information may be exchanged between UEs through PC5-RRC. The second method is a case in which the configuration of DRX parameter information is supported through PC5-RRC in a state where one or more of the methods 1, 2, and 3 are considered. If not only communication between UEs that have established a PC5-RRC link but also sidelink communication with a UE that has not established a PC5-RRC link are considered, the DRX parameter configuration through PC5-RRC needs to consider the DRX on-duration by pre-configured DRX parameters. Specifically, it is necessary to align DRX on-duration configured to receive a broadcast message and DRX on-duration through PC5-RRC. If the DRX on-duration configured to receive the broadcast message becomes off-duration by the DRX configuration through PC5-RRC, the UE may not receive the broadcast message.

Third Embodiment

In the third embodiment, a discontinuous reception (DRX) method between UEs in consideration of sensing and resource selection operations in the sidelink Mode2 operation is proposed. When DRX is performed in the sidelink, it is necessary to consider the sensing and resource selection operations of the UE together. For example, if a time interval during which the UE performs sensing in the sidelink is configured as DRX off-duration, the UE cannot perform SCI decoding in that interval and thereby may fail to perform the sensing operation. Also, if a specific time interval between a transmitting UE and a receiving UE performing communication in the sidelink is configured as DRX off-duration, the transmitting UE transmits control and data information in that interval, whereas the receiving UE cannot receive the information.

In order to solve this issue, the following methods may be considered. Note that, in the disclosure, the method for determining the DRX on/off intervals and the sensing and resource selection intervals is not limited to the following methods only. It is also noted that a combination of the following methods may be used.

Method for Determining DRX on/Off Intervals and Sensing/Resource Selection Intervals Method 1: Method of determining the sensing/resource selection intervals based on the DRX on-duration and off-duration intervals
   Method 2: Method of determining the DRX on/off intervals based on the sensing/resource selection intervals First, the method 1 is a method in which, when DRX is applied in the sidelink, the sensing/resource selection intervals are determined prior to the DRX on/off intervals determined by DRX configuration. In the case of method 1, the following additional operation of the UE may be considered.

A sensing window may be configured only in an interval configured as DRX on-duration. In addition, a resource selection window may be configured only in an interval configured as DRX on-duration.
      When resource (re)selection triggering occurs in a slot n, and when the sensing window [n−T0, n−Tproc,0] configured based on the slot n overlaps with an interval configured as DRX off-duration, the sensing window may be configured to avoid the DRX off-duration. In this case, the sensing window may be extended as much as it overlaps with the interval configured as the DRX off-duration, so that sensing can be performed in DRX on-duration.
      When resource (re)selection triggering occurs in a slot n, and when the resource selection window [n+T1, n+T2] configured based on the slot n overlaps with an interval configured as DRX off-duration, the resource selection window may be configured to avoid the DRX off-duration. In this case, the resource selection window may be configured in the DRX on-duration under the condition that a packet delay budget (PDB) is satisfied.

Next, the method 2 is a method in which, when DRX is applied in the sidelink, the DRX on/off intervals are determined prior to the determined sensing/resource selection intervals. In the case of method 2, the following UE operation may be considered.

When the DRX cycle is configured, on-duration (or active time) may include the following.
      Condition 1: When drx-onDurationTimer or drx-InactivityTimer or drx-RetransmissionTimer is running, or
      Condition 2: An interval configured as the sensing window or the resource selection window, or
      Condition 3: When the UE requests a resource from another UE For the condition 1, refer to the description of FIGS. 7A to 7D. The condition 2 is the method proposed in the third embodiment of the disclosure and the method in which the sensing window [n−T0, n−Tproc,0] or the resource selection window [n+T1, n+T2] configured based on the slot n is operated as the DRX on-duration (or active time) when resource (re)selection triggering occurs in the slot n. In the case that the interval configured as the sensing window or the resource selection window according to the condition 2 is configured as the DRX on-duration, the corresponding information may be indicated to and shared with other UEs. In addition, the condition 3 refers to the fourth embodiment below.

Fourth Embodiment

In the fourth embodiment, a method of operating discontinuous reception (DRX) between UEs is proposed in the case that inter-UE coordination is performed in the sidelink.

Figure 10:
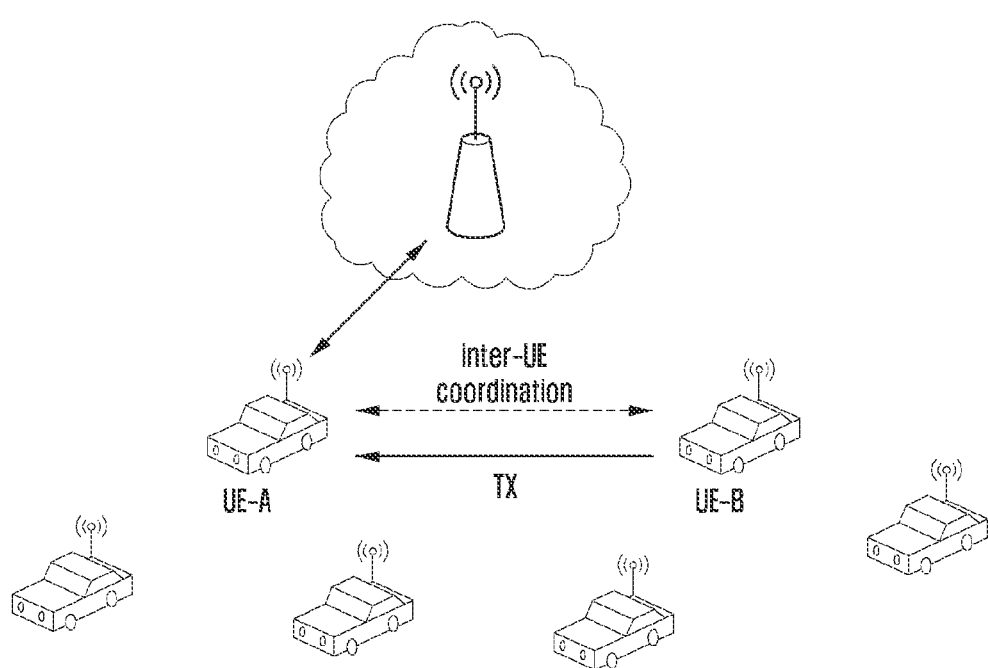
FIG. 10 is a diagram illustrating a scenario of performing inter-UE coordination according to an embodiment of the disclosure.

FIG. 10 is a diagram illustrating a scenario of performing inter-UE coordination according to an embodiment of the disclosure. Here, the inter-UE coordination may refer to providing an improved sidelink service by sharing helpful information between UEs. In the disclosure, information shared for inter-UE coordination is not limited to specific information. However, the disclosure focuses on resource allocation related information. In general, the UE that performs transmission in the sidelink may allocate a resource through a direct sensing and resource selection procedure (Mode2), or when the UE performing transmission is within the coverage of the base station (BS), the base station may allocate a resource (Mode1). However, a method in which the UE receives resource allocation and resource allocation related information from another UE through inter-UE coordination may be additionally considered. If the UE performing transmission is a UE requiring low power consumption, such as a mobile terminal, the power consumption of the UE can be minimized when another UE performs resource allocation instead. Note that a lot of power may be consumed for the UE to perform sensing to select a sidelink transmission resource. Therefore, in consideration of this advantage, a method of receiving resource allocation related information from another UE through inter-UE coordination may be considered. However, the operation of continuously receiving resource allocation information from another UE may also cause power consumption of the UE. Therefore, through DRX operation and a wake-up signal (WUS), a method in which the UE receives resource allocation related information from another UE may be used.

Specifically, FIG. 10 shows a case in which UE-B receives resource allocation information from UE-A through inter-UE coordination. In the disclosure, time and frequency resource allocation information provided by UE-A to UE-B is called resource selection assistance information (RSAI). Note that the term RSAI used in the disclosure may be replaced with other terms. Although FIG. 10 illustrates a case in which UE-A indicates the RSAI to UE-B and UE-B performs transmission to UE-A, the disclosure is not limited thereto. That is, using the RSAI provided by UE-A, UE-B may perform transmission to a UE other than UE-A. In addition, UE-B may receive the RSAI from a UE other than UE-A or from one or more UEs. The disclosure proposes a condition for the UE to transmit the RSAI and methods for DRX operation and WUS transmission. First, the following methods may be considered as the condition for the UE to transmit the RSAI. Note that the disclosure is not limited to only the following methods as the transmission condition of RSAI. It is also noted that a combination of the following methods may be used.

Condition for RSAI Transmission

Method 1: Case of receiving an RSAI request from another UE

Method 2: Case in which the base station instructs RSAI transmission

Method 3: Case in which the UE performs NACK transmission X or more times

Method 4: Case of following the decision of the UE

First, according to the method 1, a UE capable of transmitting RSAI performs RSAI transmission when receiving an RSAI request from another UE. According to FIG. 10, UE-B may request the RSAI from UE-A. The RSAI request may be made through SCI or through PC5 MAC-CE or PC5 RRC between UEs. In the case that DRX between UEs is operated in the sidelink and the method 1 is used, the UE may request the RSAI and then operate in DRX on-duration to receive the RSAI from another UE. In this case, a method in which the UE operates in DRX on-duration immediately after requesting the RSAI may be used, or a method in which the UE requests the RSAI, then a timer operates, and the UE operates in on-duration after the expiration of the timer may be used.

Next, according to the method 2, in the case that a UE capable of transmitting RSAI is within the coverage of the base station, the UE performs RSAI transmission when receiving an RSAI transmission request to another UE from the base station. According to FIG. 10, the base station may request UE-A to perform RSAI transmission to another UE. The RSAI request may be made through DCI, or may be made through Uu MAC-CE or Uu RRC between the base station and the UE. In the case that DRX between UEs is operated in the sidelink and the method 2 is used, a UE transmitting the RSAI may transmit a WUS to wake up a UE receiving the RSAI in consideration of the case where the receiving UE operates in DRX off-duration. In this case, the RSAI may be the WUS, or a method of transmitting the RSAI after WUS transmission may be used.

Next, according to the method 3, in the case that HARQ feedback transmission of the sidelink is used and NACK transmission is performed X or more times, a UE capable of transmitting RSAI performs RSAI transmission to another UE. According to FIG. 10, when reception in a resource selected by UE-B is not successful in UE-A, it may be interpreted as an operation in which UE-A selects an appropriate resource and indicates it to UE-B. In this case, the RSAI may be information on retransmission resources or information on new resource transmission. In the case that DRX between UEs is operated in the sidelink and the method 3 is used, the UE may expect to receive the RSAI after transmitting the NACK X times. In this case, a method in which the UE transmits the NACK X times and then immediately operates in DRX on-duration may be used, or a method in which the UE transmits the NACK X times, then a timer operates, and the UE operates in on-duration after the expiration of the timer may be used. Also, if RSAI information is a retransmission resource, retransmission may be performed at a corresponding resource location, and if RSAI information is information on new resource transmission, new transmission may be performed at a corresponding resource location.

Next, according to the method 4, a UE capable of transmitting RSAI performs RSAI transmission in accordance with the UE's decision. In the case that DRX between UEs is operated in the sidelink and the method 4 is used, a UE transmitting the RSAI may transmit a WUS to wake a UE receiving the RSAI in consideration of the case where the receiving UE operates in DRX off-duration. In this case, the RSAI may be the WUS, or a method of transmitting the RSAI after WUS transmission may be used. If the UE capable of transmitting RSAI wants to periodically perform RSAI transmission, the following method may be used. If the RSAI is designed as the WUS, a periodic RSAI transmission cycle may be configured and shared between UEs. In contrast, a periodic WUS transmission cycle is configured and shared between UEs, and the UE for transmitting the RSAI may transmit the RSAI after the WUS transmission.

When a UE capable of transmitting RSAI transmits the RSAI to another UE, the corresponding transmission may be performed through SCI or through PC5 MAC-CE or PC5 RRC between UEs. In the case of SCI transmission, a method in which corresponding information is included and indicated in the 1st SCI may be considered. In this case, the 1st SCI may be a new SCI format differentiated from the SCI format 1-A. In addition, in the case of SCI transmission, a method in which corresponding information is included and indicated in the 2nd SCI may be considered. In this case, the 2nd SCI may be a new SCI format differentiated from the SCI format 2-A or SCI format 2-B. The UE capable of transmitting RSAI may provide aperiodic resource allocation information to another UE and may provide periodic resource allocation information to another UE. If periodic RSAI is provided, reservation interval information for RSAI may be included as RSAI information and transmitted. In this case, for the periodic RSAI, a resource may be periodically reserved at a time location (the frequency location is the same) indicated by a reservation interval in a time and frequency location of a resource of the RSAI determined for one transport block (TB).

Figure 11:
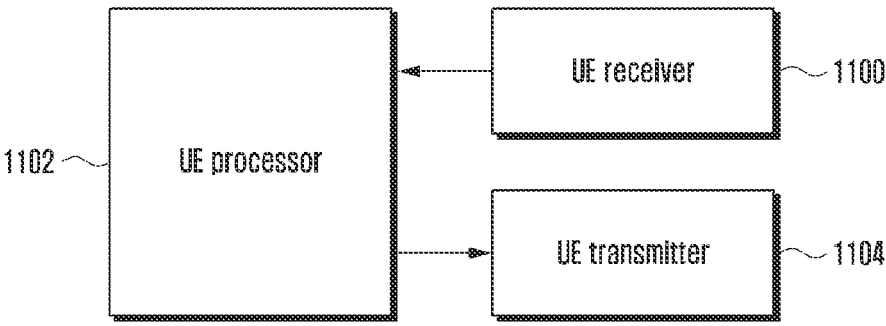
FIG. 11 is a block diagram illustrating the structure of a UE according to an embodiment of the disclosure.
Figure 12:
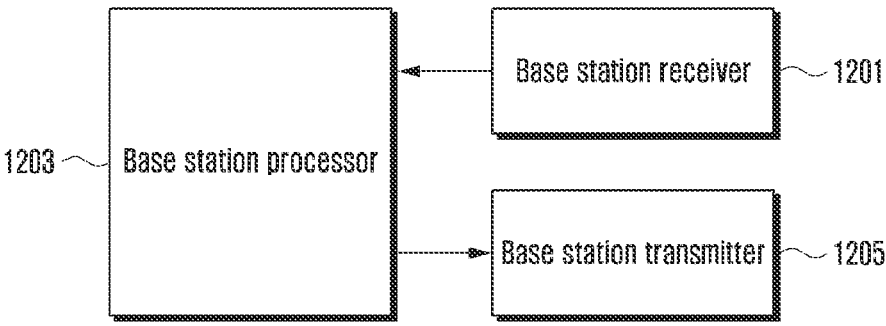
FIG. 12 is a block diagram illustrating the structure of a base station according to an embodiment of the disclosure.

A transmitter, a receiver, and a processor of the UE and the base station for performing the above embodiments of the disclosure are illustrated in FIGS. 11 and 12. In the above embodiments, a method for the UE to perform sensing and resource selection in the sidelink is shown, and to perform this, the receiver, the processor, and the transmitter of the base station and the UE should operate according to the embodiments.

Specifically, FIG. 11 is a block diagram illustrating the structure of a UE according to an embodiment of the disclosure.

As shown in FIG. 11, the UE of the disclosure may include a UE receiver 1100, a UE transmitter 1104, and a UE processor 1102. The UE receiver 1100 and the UE transmitter 1104 may be collectively referred to as a transceiver in embodiments of the disclosure. The transceiver may transmit/receive a signal to/from the base station. This signal may include control information and data. To this end, the transceiver may include an RF transmitter for up-converting and amplifying a frequency of a signal to be transmitted, and an RF receiver for low-noise amplifying and down-converting a received signal. In addition, the transceiver may receive a signal through a wireless channel and output it to the UE processor 1102, and transmit a signal outputted from the UE processor 1102 through a wireless channel. The UE processor 1102 may control a series of processes such that the UE can operate according to the above-described embodiments of the disclosure.

FIG. 12 is a block diagram illustrating the structure of a base station according to an embodiment of the disclosure.

As shown in FIG. 12, the base station of the disclosure may include a base station receiver 1201, a base station transmitter 1205, and a base station processor 1203. The base station receiver 1201 and the base station transmitter 1205 may be collectively referred to as a transceiver in embodiments of the disclosure. The transceiver may transmit/receive a signal to/from the UE. This signal may include control information and data. To this end, the transceiver may include an RF transmitter for up-converting and amplifying a frequency of a signal to be transmitted, and an RF receiver for low-noise amplifying and down-converting a received signal. In addition, the transceiver may receive a signal through a wireless channel and output it to the base station processor 1203, and transmit a signal outputted from the base station processor 1203 through a wireless channel. The base station processor 1203 may control a series of processes such that the base station can operate according to the above-described embodiments of the disclosure.

Meanwhile, the embodiments disclosed in the specification and drawings are only presented as specific examples to easily explain the technical contents of the disclosure and help the understanding of the disclosure, and it is not intended to limit the scope of the disclosure. That is, it will be apparent to those of ordinary skill in the art to which the disclosure pertains that other modifications are possible based on the technical contents of the disclosure. In addition, the above-described embodiments may be operated in combination with each other as needed. For example, in all embodiments of the disclosure, parts may be combined with each other to operate a base station and a UE.

The invention claimed is:

1. A method of a first user equipment (UE) in a wireless communication system, the method comprising:
transmitting, to a second UE, inter-UE coordination (IUC) information;
receiving, from the second UE, sidelink control information (SCI) in an active time of discontinuous reception (DRX);
receiving, from the second UE, sidelink data based on the SCI;
starting a first timer based on the SCI;

starting a second timer in response to an expiry of the first timer; and
receiving, from the second UE, a retransmission of the sidelink data while the second timer is running,
wherein the first UE is in the active time of the DRX while the second timer is running,
wherein a value for the first timer is determined based on information indicating a time resource associated with the retransmission of the sidelink data, the information being included in the SCI,
wherein the IUC information is transmitted based on an explicit request from the second UE or a condition other than the explicit request,
wherein, in case that the IUC information is transmitted based on the explicit request from the second UE, the second UE is in the active time of the DRX after a transmission of the explicit request, and
wherein, in case that the IUC information is transmitted based on the condition other than the explicit request, a wake up signal (WUS) is transmitted before the IUC information is transmitted.

2. The method of claim 1, wherein a DRX configuration of the first UE or the second UE for groupcast or broadcast is obtained based on a system information block (SIB) received from a base station.

3. The method of claim 1, wherein a DRX configuration of the first UE or the second UE for groupcast or broadcast is obtained based on pre-configured information.

4. The method of claim 1, wherein a DRX configuration of the first UE or the second UE for unicast is obtained based on a radio resource control (RRC) connection between the first UE and the second UE.

5. The method of claim 1, wherein the SCI comprises first SCI received in a physical sidelink control channel (PSCCH) and second SCI received in a physical sidelink shared channel (PSSCH), and
wherein the first UE is in the active time of the DRX while a third timer is running, and the third timer starts based on the SCI comprising the first SCI and the second SCI.

6. A first user equipment (UE) in a wireless communication system, the first UE comprising:
a transceiver; and
a controller configured to:
transmit, to a second UE, inter-UE coordination (IUC) information,
receive, from the second UE, sidelink control information (SCI) in an active time of discontinuous reception (DRX),
receive, from the second UE, sidelink data based on the SCI,
start a first timer based on the SCI,
start a second timer in response to an expiry of the first timer, and
receive, from the second UE, a retransmission of the sidelink data while the second timer is running,
wherein the first UE is in the active time of the DRX while the second timer is running,
wherein a value for the first timer is determined based on information indicating a time resource associated with the retransmission of the sidelink data, the information being included in the SCI,
wherein the IUC information is transmitted based on an explicit request from the second UE or a condition other than the explicit request,
wherein, in case that the IUC information is transmitted based on the explicit request from the second UE, the second UE is in the active time of the DRX after a transmission of the explicit request, and wherein, in case that the IUC information is transmitted based on the condition other than the explicit request, a wake up signal (WUS) is transmitted before the IUC information is transmitted.

7. The first UE of claim 6, wherein a DRX configuration of the first UE or the second UE for groupcast or broadcast is obtained based on a system information block (SIB) received from a base station.

8. The first UE of claim 6, wherein a DRX configuration of the first UE or the second UE for groupcast or broadcast is obtained based on pre-configured information.

9. The first UE of claim 6, wherein a DRX configuration of the first UE or the second UE for unicast is obtained based on a radio resource control connection (RRC) between the first UE and the second UE.

10. The first UE of claim 6, wherein the SCI comprises first SCI received in a physical sidelink control channel (PSCCH) and second SCI received in a physical sidelink shared channel (PSSCH), and wherein the first UE is in the active time of the DRX while a third timer is running, and the third timer starts based on the SCI comprising the first SCI and the second SCI.

11. A method of a second user equipment (UE) in a wireless communication system, the method comprising:

receiving, from a first UE, inter-UE coordination (IUC) information, transmitting, to the first UE, sidelink control information (SCI) in an active time of a discontinuous reception (DRX);

transmitting, to the first UE, sidelink data according to the SCI; and transmitting, to the first UE, a retransmission of the sidelink data while a second timer of the first UE is running, wherein the second timer of the first UE starts in response to an expiry of a first timer started based on the SCI, wherein a value for the first timer is determined based on information indicating a time resource associated with the retransmission of the sidelink data, the information being included in the SCI, wherein the IUC information is received based on an explicit request from the second UE or a condition other than the explicit request, wherein, in case that the IUC information is received based on the explicit request from the second UE, the second UE is in the active time of the DRX after a transmission of the explicit request, and wherein, in case that the IUC information is received based on the condition other than the explicit request, a wake up signal (WUS) is received before the IUC information is received.

12. The method of claim 11, wherein a DRX configuration of the first UE or the second UE for groupcast or broadcast is obtained based on a system information block (SIB) received from a base station.

13. The method of claim 11, wherein a DRX configuration of the first UE or the second UE for groupcast or broadcast is obtained based on pre-configured information.

14. The method of claim 11, wherein a DRX configuration of the first UE or the second UE for unicast is obtained based on a radio resource control (RRC) connection between the first UE and the second UE.

15. A second user equipment (UE) in a wireless communication system, the second UE comprising:

a transceiver; and a controller configured to:

receive, from a first UE, inter-UE coordination (IUC) information, transmit, to the first UE, sidelink control information (SCI) in an active time of a discontinuous reception (DRX), transmit, to the first UE, sidelink data according to the SCI, and transmit, to the first UE, a retransmission of the sidelink data while a second timer of the first UE is running, wherein the second timer of the first UE starts in response to an expiry of a first timer started based on the SCI, wherein a value for the first timer is determined based on information indicating a time resource associated with the retransmission of the sidelink data, the information being included in the SCI, wherein the IUC information is received based on an explicit request from the second UE or a condition other than the explicit request, wherein, in case that the IUC information is received based on the explicit request from the second UE, the second UE is in the active time of the DRX after a transmission of the explicit request, and wherein, in case that the IUC information is received based on the condition other than the explicit request, a wake up signal (WUS) is received before the IUC information is received.

* * * * *